US007200607B2

(12) United States Patent
    Downs

(10) Patent No.: US 7,200,607 B2
(45) Date of Patent: Apr. 3, 2007

(54) DATA ANALYSIS SYSTEM FOR CREATING A COMPARATIVE PROFILE REPORT

(75) Inventor: Robert Harry Downs, Stockport (GB)

(73) Assignee: Apteco Limited (GB)

( * ) Notice: Subject to any disclaimer, the term of this patent is extended or adjusted under 35 U.S.C. 154(b) by 503 days.

(21) Appl. No.: 10/385,892

(22) Filed: Mar. 11, 2003

(65) Prior Publication Data

US 2003/0233339 A1    Dec. 18, 2003

(30) Foreign Application Priority Data

Mar. 12, 2002  (GB) ................................. 0205727.1

(51) Int. Cl.
    *G06F 17/30*    (2006.01)
(52) U.S. Cl. .......................................... 707/102; 707/7
(58) Field of Classification Search ................ 707/101, 707/6, 7, 102, 104.1
    See application file for complete search history.

(56) References Cited

U.S. PATENT DOCUMENTS 5,787,412 A    7/1998  Bosch et al. .................... 707/2
5,884,322 A    3/1999  Sidhu et al. .................. 707/200
2002/0138334 A1 *  9/2002  DeCotiis et al. .............. 705/10

* cited by examiner

*Primary Examiner*—Leslie Wong
(74) *Attorney, Agent, or Firm*—Woodcock Washburn LLP

(57) ABSTRACT

A database analysis system comprising a store for storing databases, a user input and a user output, and a processor. The store includes a first database having a plurality of records of prospective customers each record having predictor variables such as information about the prospective customer including contact details and customer characteristics, the predictor variables being discretely identifiable in separate fields, each variable being categorized into two or more categories, such as household income level, the store also includes a second database of responders comprising a plurality of records of predictor variables of selected customers such as actual respondents to an earlier survey. The processor is adapted to compare the predictor variables for each of the records in the first and second database and to generate an output to the user output to enable the user to view the comparative result, such as in the form of a profile report.

35 Claims, 16 Drawing Sheets

| URN | Initial | Surname | Gender | YOB | Region | Job | House | Income Band | Months | Package Type | Source |
|---|---|---|---|---|---|---|---|---|---|---|---|
| 2 | O | Slater | Male | 0 | Northern Ireland | Unemployed | Terrace | <10k | 0 | Telephone Only | Other |
| 8 | E | Maltby | Female | 0 | Northern Ireland | Professional | Detached | 50-100k | 6 | Telephone Only | Direct mail |
| 9 | L | Roberts | Male | 0 | Northern Ireland | Professional | Detached | 50-100k | 6 | Telephone Only | Direct mail |
| 16 | I | Downs | Female | 8 | Greater London | Non-working Partner | Terrace | 10-15k | 8 | Telephone Only | Telesales |
| 25 | T | Guarido | Female | 0 | Northern Ireland | Unemployed | Terrace | <10k | 0 | Telephone Only | Other |
| 28 | O | Peters | Male | 40 | Northern Ireland | Non-working Partner | Terrace | 10-15k | 5 | Telephone Only | Telesales |
| 29 | V | Widlund | Male | 0 | Northern Ireland | Unemployed | Terrace | <10k | 0 | Telephone Only | Other |
| 30 | C | Singh | Female | 24 | North East | Non-working Partner | Terrace | <10k | 1 | Telephone Only | Telesales |
| 38 | G | Ray | Male | 43 | North West | Office Worker | Semi Detached | 20-30k | 5 | Basic TV+ Sports | Direct mail |
| 45 | D | Butters | Female | 61 | Scotland | Sales | Terrace | 10-15k | 5 | Telephone Only | Direct mail |
| 46 | K | Lash | Male | 65 | South West | Sales | Terrace | 10-15k | 2 | Telephone Only | Direct mail |
| 50 | M | Smith | Female | 62 | Wales | Sales | Flat | 15-20k | 7 | Basic TV+ Sports | Direct mail |
| 53 | H | Vallance | Female | 72 | Wales | Unemployed | Flat | 15-20k | 0 | Basic TV+ Sports | Direct mail |
| 62 | S | Santer | Male | 66 | East Anglia | Non-working Partner | Terrace | 10-15k | 1 | Basic TV | Telesales |
| 79 | H | Roberts | Male | 52 | North East | Non-working Partner | Semi Detached | 30-40k | 9 | Basic TV+ Sports | Direct mail |
| 84 | Q | Krystman | Male | 66 | Scotland | Office Worker | Semi Detached | 40-50k | 2 | Basic TV+ Sports | Direct mail |
| 124 | K | Vapnik | Female | 64 | North East | Non-working Partner | Flat | 20-30k | 2 | All channels | Direct mail |
| 143 | N | Ray | Female | 41 | Scotland | Office Worker | Semi Detached | 20-30k | 4 | Basic TV+ Sports | Telesales |
| 152 | Y | Alty | Female | 56 | East Anglia | Sales | Flat | 20-30k | 8 | All channels | Direct mail |
| 199 | P | Heaselgrave | Male | 44 | North East | Office Worker | Semi Detached | 20-30k | 0 | All channels | Direct mail |
| 225 | P | Smith | Female | 51 | Scotland | Sales | Flat | 15-20k | 4 | Basic TV+ Sports | Direct mail |
| 255 | R | Butters | Female | 67 | South East | Office Worker | Flat | 15-20k | 7 | Basic TV+ Sports | Direct mail |
| 328 | I | Craig | Female | 54 | North East | Manual Worker | Flat | 20-30k | 8 | All channels | Telesales |
| 1005 | P | Guarido | Female | 66 | East Anglia | Office Worker | Flat | 20-30k | 7 | All channels | Telesales |
| 106568 | K | Peters | Female | 72 | Wales | Sales | Terrace | 10-15k | 9 | All channels | Telesales |
| 121195 | L | Guarido | Female | 71 | Scotland | Manual Worker | Terrace | 10-15k | 2 | All channels | Telesales |

FIG. 2

| URN | Initial | Surname | Gender | YOB | Region | Job | House | Income Band | Months | Package Type | Source |
|---|---|---|---|---|---|---|---|---|---|---|---|
| 72 | O | Slater | Male | 0 | Northern Ireland | Unemployed | Terrace | <10k | 0 | Telephone Only | Other |
| 8 | E | Maltby | Female | 0 | Northern Ireland | Professional | Detached | 50-100k | 6 | Telephone Only | Direct mail |
| 9 | L | Roberts | Male | 0 | Northern Ireland | Professional | Detached | 50-100k | 6 | Telephone Only | Direct mail |
| 16 | I | Downs | Female | 8 | Greater London | Non-working Partner | Terrace | 10-15k | 8 | Telephone Only | Telesales |
| 25 | T | Guarido | Female | 0 | Northern Ireland | Unemployed | Terrace | <10k | 0 | Telephone Only | Other |
| 28 | O | Peters | Male | 40 | Northern Ireland | Non-working Partner | Terrace | 10-15k | 5 | Telephone Only | Telesales |
| 29 | V | Widlund | Male | 0 | Northern Ireland | Unemployed | Terrace | <10k | 0 | Telephone Only | Other |
| 30 | C | Singh | Female | 24 | North East | Non-working Partner | Terrace | <10k | 1 | Telephone Only | Telesales |
| 38 | G | Ray | Male | 43 | North West | Office Worker | Semi Detached | 20-30k | 5 | Basic TV+ Sports | Direct mail |
| 45 | D | Butters | Female | 61 | Scotland | Sales | Terrace | 10-15k | 5 | Telephone Only | Direct mail |
| 46 | K | Lash | Male | 65 | South West | Sales | Terrace | 10-15k | 2 | Telephone Only | Direct mail |
| 50 | M | Smith | Female | 62 | Wales | Sales | Flat | 15-20k | 7 | Basic TV+ Sports | Direct mail |
| 53 | H | Vallance | Female | 72 | Wales | Unemployed | Flat | 15-20k | 0 | Basic TV+ Sports | Direct mail |
| 62 | S | Santer | Male | 66 | East Anglia | Non-working Partner | Terrace | 10-15k | 1 | Basic TV | Telesales |
| 79 | H | Roberts | Male | 52 | North East | Non-working Partner | Semi Detached | 30-40k | 9 | Basic TV+ Sports | Direct mail |
| 84 | Q | Krystman | Male | 66 | Scotland | Office Worker | Semi Detached | 40-50k | 2 | Basic TV+ Sports | Direct mail |
| 124 | K | Vapnik | Female | 64 | North East | Non-working Partner | Flat | 20-30k | 2 | All channels | Direct mail |
| 143 | N | Ray | Female | 41 | Scotland | Office Worker | Semi Detached | 20-30k | 4 | Basic TV+ Sports | Telesales |
| 152 | Y | Alty | Female | 56 | East Anglia | Sales | Flat | 20-30k | 8 | All channels | Direct mail |
| 199 | P | Heaselgrave | Male | 44 | North East | Office Worker | Semi Detached | 20-30k | 0 | All channels | Direct mail |
| 225 | P | Smith | Female | 51 | Scotland | Sales | Flat | 15-20k | 4 | Basic TV+ Sports | Direct mail |
| 255 | R | Butters | Female | 67 | South East | Office Worker | Flat | 15-20k | 7 | Basic TV+ Sports | Direct mail |
| 328 | I | Craig | Female | 54 | North East | Manual Worker | Flat | 20-30k | 8 | All channels | Telesales |
| 1005 | P | Guarido | Female | 66 | East Anglia | Office Worker | Flat | 20-30k | 7 | All channels | Telesales |
| 106568 | K | Peters | Female | 72 | Wales | Sales | Terrace | 10-15k | 9 | All channels | Telesales |
| 121195 | L | Guarido | Female | 71 | Scotland | Manual Worker | Terrace | 10-15k | 2 | All channels | Telesales |

| URN | Initial | Surname | Gender | YOB | Region | Job | House | Income Band | Months | Package Type | Source |
|---|---|---|---|---|---|---|---|---|---|---|---|
| 9 | L | Roberts | Male | 0 | Northern Ireland | Professional | Detached | 50-100k | 6 | Telephone Only | Direct mail |
| 25 | T | Guarido | Female | 0 | Northern Ireland | Unemployed | Terrace | <10k | 0 | Telephone Only | Other |
| 28 | O | Peters | Male | 40 | Northern Ireland | Non-working Partner | Terrace | 10-15k | 5 | Telephone Only | Telesales |
| 29 | V | Widlund | Male | 0 | Northern Ireland | Unemployed | Terrace | <10k | 0 | Telephone Only | Other |
| 38 | G | Ray | Male | 43 | North West | Office Worker | Semi Detached | 20-30k | 5 | Basic TV+ Sports | Direct mail |
| 45 | D | Butters | Female | 61 | Scotland | Sales | Terrace | 10-15k | 5 | Telephone Only | Direct mail |
| 46 | K | Lash | Female | 65 | South West | Sales | Terrace | 10-15k | 2 | Telephone Only | Direct mail |
| 50 | M | Smith | Female | 62 | Wales | Sales | Flat | 15-20k | 7 | Basic TV+ Sports | Direct mail |
| 62 | S | Santer | Male | 66 | East Anglia | Non-working Partner | Terrace | 10-15k | 1 | Basic TV | Telesales |
| 79 | H | Roberts | Male | 52 | Wales | Non-working Partner | Semi Detached | 30-40k | 9 | Basic TV+ Sports | Direct mail |
| 84 | Q | Krystman | Male | 66 | East Anglia | Office Worker | Semi Detached | 40-50k | 2 | Basic TV+ Sports | Direct mail |
| 124 | K | Vapnick | Female | 64 | North East | Non-working Partner | Flat | 20-30k | 2 | All channels | Direct mail |
| 152 | Y | Alty | Female | 56 | East Anglia | Sales | Flat | 15-20k | 8 | All channels | Direct mail |
| 225 | P | Smith | Female | 51 | Scotland | Sales | Flat | 15-20k | 4 | Basic TV+ Sports | Direct mail |
| 255 | R | Butters | Female | 67 | South East | Office Worker | Flat | 15-20k | 7 | Basic TV+ Sports | Direct mail |
| 1005 | P | Guarido | Female | 66 | East Anglia | Office Worker | Flat | 20-30k | 7 | All channels | Telesales |
| 106568 | K | Peters | Female | 72 | Wales | Sales | Terrace | 10-15k | 9 | All channels | Telesales |

| Variables | Report | | | | Analysis/Base | | Advanced | | Model |
|---|---|---|---|---|---|---|---|---|---|
| | Analysis | Base | Analysis % | Base % | Index | Z Score | Penetration | | |
| House | | | | | | | | | |
| Terrace | 9,249 | 140,481 | 48.02 | 44.78 | 107.22 | 9.03 | | | |
| Flat | 5,933 | 79,286 | 30.8 | 9,249 | 121.87 | 17.65 | | | |
| Semi Detached | 2,773 | 49,507 | 14.4 | 9,249 | 91.22 | -5.28 | | | |
| Detached | 1,307 | 44,420 | 6.79 | 9,249 | 47.92 | -29.36 | | | |
| TOTAL | 19,262 | 313,694 | | | | | | | |
| Income Band | | | | | | | | | |
| <10k | 3,322 | 74,796 | 17.25 | 23.84 | 72.33 | -21.49 | | | |
| 10-15k | 5,927 | 65,685 | 30.77 | 20.94 | 146.95 | 33.53 | | | |
| 15-20k | 4,496 | 57,668 | 23.34 | 18.38 | 126.97 | 17.76 | | | |
| 20-30k | 2,980 | 47,213 | 15.47 | 15.05 | 102.79 | 1.63 | | | |
| 30-40 | 878 | 16,550 | 4.56 | 5.28 | 86.4 | -4.46 | | | |
| 40-50k | 674 | 16,084 | 3.5 | 5.13 | 68.24 | -10.25 | | | |
| 50-100k | 704 | 23,603 | 3.65 | 7.52 | 48.57 | -20.36 | | | |
| 100k+ | 281 | 12,095 | 1.46 | 3.86 | 37.84 | -17.28 | | | |
| TOTAL | 19,262 | 313,694 | | | | | | | |

| Variables | Report | | Analysis/Base | | | Advanced | | | Model | |
|---|---|---|---|---|---|---|---|---|---|---|
| | Analysis | Base | Analysis % | Base % | Index | Z Score | ZdExp | PWE | Penetration |
| House | | | | | | | | | |
| Terrace | 9,249 | 140,481 | 48.02 | 44.78 | 107.22 | 9.03 | 9.32 | 0.11 | |
| Flat | 5,933 | 79,286 | 30.8 | 25.27 | 121.87 | 17.65 | 18.22 | 0.31 | |
| Semi Detached | 2,773 | 49,507 | 14.4 | 15.78 | 91.22 | -5.28 | -5.44 | -0.14 | |
| Detached | 1,307 | 44,420 | 6.79 | 14.16 | 47.92 | -29.36 | -30.30 | -1.11 | |
| TOTAL | 19,262 | 313,694 | | | | | | | |
| Income Band | | | | | | | | | |
| <10k | 3,322 | 74,796 | 17.25 | 23.84 | 72.33 | -21.49 | -22.18 | -0.49 | |
| 10-15k | 5,927 | 65,685 | 30.77 | 20.94 | 146.95 | 33.53 | 34.62 | 0.60 | |
| 15-20k | 4,496 | 57,668 | 23.34 | 18.38 | 126.97 | 17.76 | 18.34 | 0.37 | |
| 20-30k | 2,980 | 47,213 | 15.47 | 15.05 | 102.79 | 1.63 | 1.68 | 0.04 | |
| 30-40 | 878 | 16,550 | 4.56 | 5.28 | 86.4 | -4.46 | -4.60 | -0.22 | |
| 40-50k | 674 | 16,084 | 3.5 | 5.13 | 68.24 | -10.25 | -10.57 | -0.58 | |
| 50-100k | 704 | 23,603 | 3.65 | 7.52 | 48.57 | -20.36 | -20.01 | -1.09 | |
| 100k+ | 281 | 12,095 | 1.46 | 3.86 | 37.84 | -17.28 | -17.83 | -1.46 | |
| TOTAL | 19,262 | 313,694 | | | | | | | |

*FIG. 8*

| URN | Gender | YOB | Region | Job | House | Income Band | Months | Package Type | Source | PWE Source |
|---|---|---|---|---|---|---|---|---|---|---|
| 2 | Male | 0 | Northern Ireland | Unemployed | Terrace | <10k | 0 | Telephone Only | Other | [-13.00,-12.00) |
| 8 | Female | 0 | Northern Ireland | Professional | Detached | 50-100k | 6 | Telephone Only | Direct mail | [-13.00,-12.00) |
| 9 | Male | 0 | Northern Ireland | Professional | Detached | 50-100k | 6 | Telephone Only | Direct mail | [-13.00,-12.00) |
| 16 | Female | 8 | Greater London | Non-working Partner | Terrace | 10-15k | 8 | Telephone Only | Telesales | [-5.00,-4.00) |
| 25 | Female | 0 | Northern Ireland | Unemployed | Terrace | <10k | 0 | Telephone Only | Other | [-13.00,-12.00) |
| 28 | Male | 40 | Northern Ireland | Non-working Partner | Terrace | 10-15k | 5 | Telephone Only | Telesales | [-5.00,-4.00) |
| 29 | Male | 0 | Northern Ireland | Unemployed | Terrace | <10k | 0 | Telephone Only | Other | [-13.00,-12.00) |
| 30 | Female | 24 | North East | Non-working Partner | Terrace | <10k | 1 | Telephone Only | Telesales | [-5.00,-4.00) |
| 38 | Male | 43 | North West | Office Worker | Semi Detached | 20-30k | 5 | Basic TV+ Sports | Direct mail | [1.00,0.00) |
| 45 | Female | 61 | Scotland | Sales | Terrace | 10-15k | 5 | Telephone Only | Direct mail | [-5.00,-4.00) |
| 46 | Male | 65 | South West | Sales | Terrace | 10-15k | 2 | Telephone Only | Direct mail | [-5.00,-4.00) |
| 50 | Female | 62 | Wales | Sales | Flat | 15-20k | 7 | Basic TV+ Sports | Direct mail | Direct mail |
| 53 | Female | 72 | Wales | Unemployed | Flat | 15-20k | 0 | Basic TV+ Sports | Direct mail | [1.00,0.00) |
| 62 | Male | 66 | East Anglia | Non-working Partner | Terrace | 10-15k | 1 | Basic TV | Telesales | [1.00,0.00) |
| 79 | Male | 52 | North East | Non-working Partner | Semi Detached | 30-40k | 9 | Basic TV+ Sports | Direct mail | [1.00,0.00) |
| 84 | Male | 66 | Scotland | Office Worker | Semi Detached | 40-50k | 2 | Basic TV+ Sports | Direct mail | [1.00,0.00) |
| 124 | Female | 64 | North East | Non-working Partner | Flat | 20-30k | 2 | All channels | Direct mail | [3.00,4.00) |
| 143 | Female | 41 | Scotland | Office Worker | Semi Detached | 20-30k | 4 | Basic TV+ Sports | Telesales | [1.00,2.00) |
| 152 | Female | 56 | East Anglia | Sales | Flat | 20-30k | 8 | All channels | Direct mail | [3.00,4.00) |
| 199 | Male | 44 | North East | Office Worker | Semi Detached | 20-30k | 0 | All channels | Direct mail | [1.00,2.00) |
| 225 | Female | 51 | Scotland | Sales | Flat | 15-20k | 4 | Basic TV+ Sports | Direct mail | [1.00,2.00) |
| 255 | Female | 67 | South East | Office Worker | Flat | 15-20k | 7 | Basic TV+ Sports | Direct mail | [1.00,0.00) |
| 328 | Female | 54 | North East | Manual Worker | Flat | 20-30k | 8 | All channels | Telesales | [5.00,6.00) |
| 1005 | Female | 66 | East Anglia | Office Worker | Flat | 20-30k | 7 | All channels | Telesales | [5.00,6.00) |
| 106568 | Female | 72 | Wales | Sales | Terrace | 10-15k | 9 | All channels | Telesales | [7.00,8.00) |
| 121195 | Female | 71 | Scotland | Manual Worker | Terrace | 10-15k | 2 | All channels | Telesales | [7.00,8.00) |

FIG. 9

| Selection | Analyse | Data | User | Help | | | | | | | | | | | | | |
|---|---|---|---|---|---|---|---|---|---|---|---|---|---|---|---|---|---|

Highlight the categories to be included

⦿ Find containing:   ○ Find beginning with:

Data items
● cabletv
├─ ○ Year Of Birth
├─ ○ Centile
├─ ○ Gender
├─ ○ House
├─ ○ Income Band
├─ ○ Initial
├─ ○ Job
├─ ○ Package Type
├─ ○ Region
├─ ○ Response
├─ ○ Months since start date
├─ ○ Original Source
├─ ○ URN
└─ ⌸ Profiles
    ├─ ▣ Response Model 2
    └─ ○ withers

| Description | Total |
|---|---|
| ✓ [7.00,8.00) | 12 |
| ✓ [6.00,7.00) | 302 |
| ✓ [5.00,6.00) | 1319 |
| ✓ [4.00,5.00) | 2016 |
| ✓ [3.00,4.00) | 5214 |
| ✓ [2.00,3.00) | 7544 |
| [1.00,2.00) | 8103 |
| [0.00,1.00) | 14482 |
| [-1.00,0.00) | 11929 |
| [-2.00,-1.00) | 12587 |
| [-3.00,-2.00) | 19755 |
| [-4.00,-3.00) | 20436 |

⎫
⎬ 114
⎭

| Include ▸ | OR ▸ | Reset | Total |
|---|---|---|---|

| Submit Count | Reset Entire Selection |
|---|---|

*FIG. 10*

| Models | Options | | Target and Base | | | Segment Gains | | | Cumulative Gains | | | Response Chart | | | Profit |
|---|---|---|---|---|---|---|---|---|---|---|---|---|---|---|---|
| | Model Grade | Model Score | Yes | No | Total | Yes % | No % | % Yes | % No | % Total | Gain | Revenue | Cost | |
| Response Model 1 | | | | | | | | | | | | | | | |
| [7.00,8.00) | 1 | 05 | 12 | 0 | 12 | 100.00 | 0.00 | 0.06 | 0.00 | 0.00 | 16.28 | 120.00 | 12.00 | |
| [6.00,7.00) | 2 | 06 | 285 | 2 | 287 | 99.30 | 0.70 | 1.48 | 0.00 | 0.09 | 16.17 | 2,850.00 | 287.00 | |
| [5.00,6.00) | 3 | 07 | 1,286 | 39 | 1,325 | 97.06 | 2.94 | 6.68 | 0.01 | 0.42 | 15.80 | 12,860.00 | 1,325.00 | |
| [4.00,5.00) | 4 | 08 | 1,704 | 290 | 1,994 | 85.46 | 14.54 | 8.85 | 0.10 | 0.64 | 13.92 | 17,040.00 | 1,994.00 | |
| [3.00,4.00) | 5 | 09 | 2,763 | 2,370 | 5,132 | 53.82 | 46.18 | 14.34 | 0.81 | 1.64 | 8.76 | 27,620.00 | 5,132.00 | |
| [2.00,3.00) | 6 | 10 | 3,188 | 4,328 | 7,516 | 42.42 | 57.58 | 16.55 | 1.47 | 2.40 | 6.91 | 31,880.00 | 7,516.00 | |
| [1.00,2.00) | 7 | 11 | 2,547 | 5,401 | 7,948 | 32.05 | 67.95 | 13.22 | 1.83 | 2.53 | 5.22 | 25,470.00 | 7,948.00 | |
| [0.00,1.00) | 8 | 12 | 2,956 | 11,910 | 14,766 | 19.34 | 80.66 | 14.83 | 4.05 | 4.71 | 3.15 | 28,560.00 | 14,766.00 | |
| [-1.00,0.00) | 9 | 13 | 1,728 | 10,004 | 11,732 | 14.73 | 85.27 | 8.97 | 3.40 | 3.74 | 2.40 | 17,280.00 | 11,732.00 | |
| [-2.00,-1.00) | 10 | 14 | 1,041 | 11,475 | 12,516 | 8.32 | 91.68 | 5.40 | 3.90 | 3.99 | 1.35 | 10,410.00 | 12,586.00 | |
| [-3.00,-2.00) | 11 | 15 | 681 | 18,905 | 19,586 | 3.48 | 96.52 | 3.54 | 6.42 | 6.24 | 0.57 | 6,810.00 | 19,586.00 | |
| [-4.00,-3.00) | 12 | 16 | 321 | 21,949 | 22,270 | 1.44 | 98.56 | 1.67 | 7.46 | 7.10 | 0.23 | 3,210.00 | 22,270.00 | |
| [-5.00,-4.00) | 13 | 17 | 231 | 29,079 | 29,310 | 0.79 | 99.21 | 1.20 | 9.88 | 9.34 | 0.13 | 2,310.00 | 29,310.00 | |
| [-6.00,-5.00) | 14 | 18 | 100 | 37,399 | 37,499 | 0.27 | 99.73 | 0.52 | 12.70 | 11.96 | 0.04 | 1,000.00 | 37,499.00 | |
| [-7.00,-6.00) | 15 | 19 | 70 | 30,907 | 30,977 | 0.23 | 99.77 | 0.36 | 10.50 | 9.88 | 0.04 | 700.00 | 30,977.00 | |
| [-8.00,-7.00) | 16 | 20 | 87 | 25,112 | 25,199 | 0.35 | 99.65 | 0.45 | 8.53 | 8.03 | 0.06 | 870.00 | 25,199.00 | |
| [-9.00,-8.00) | 17 | 21 | 107 | 20,960 | 21,067 | 0.51 | 99.49 | 0.56 | 7.12 | 6.72 | 0.08 | 1,070.00 | 21,067.00 | |
| [-10.00,-9.00) | 18 | 22 | 98 | 17,985 | 18,083 | 0.54 | 99.46 | 0.51 | 6.11 | 5.77 | 0.09 | 980.00 | 18,083.00 | |

FIG. 14

| Models | Options | | Target and Base | | | Segment Gains | | Cumulative Gains | | | Response Chart | | |
|---|---|---|---|---|---|---|---|---|---|---|---|---|---|
| Model Grade | Model Score | Yes | No | Total | Yes % | No % | % Yes | % No | % Total | Gain | Revenue | Cost |
| Response Model 1 | | | | | | | | | | | | | |
| [7.00,8.00) | 1 | 05 | 12 | 0 | 12 | 100.00 | 0.00 | 0.06 | 0.00 | 0.00 | 16.28 | 120.00 | 12.00 |
| [6.00,7.00) | 2 | 06 | 297 | 2 | 299 | 99.33 | 0.67 | 1.54 | 0.00 | 0.10 | 16.18 | 2,970.00 | 299.00 |
| [5.00,6.00) | 3 | 07 | 1,583 | 41 | 1,624 | 97.48 | 2.52 | 8.22 | 0.01 | 0.52 | 15.87 | 15,833.00 | 1,624.00 |
| [4.00,5.00) | 4 | 08 | 3,287 | 331 | 3,618 | 90.85 | 9.15 | 17.06 | 0.11 | 1.15 | 14.79 | 32,870.00 | 3,618.00 |
| [3.00,4.00) | 5 | 09 | 6,049 | 2,701 | 8,750 | 69.13 | 30.87 | 31.40 | 0.92 | 2.79 | 11.26 | 60,490.00 | 8,750.00 |
| [2.00,3.00) | 6 | 10 | 9,237 | 7,029 | 16,266 | 56.79 | 43.21 | 47.95 | 2.39 | 5.19 | 9.25 | 92,370.00 | 16,266.00 |
| [1.00,2.00) | 7 | 11 | 11,784 | 12,430 | 24,214 | 48.67 | 51.33 | 61.18 | 4.22 | 7.72 | 7.92 | 117,840.00 | 24,214.00 |
| [0.00,1.00) | 8 | 12 | 14,640 | 24,340 | 38,980 | 37.55 | 62.44 | 76.00 | 8.27 | 12.43 | 6.12 | 146,400.00 | 38,980.00 |
| [-1.00,0.00) | 9 | 13 | 16,368 | 34,344 | 50,712 | 32.28 | 67.72 | 84.98 | 11.67 | 16.17 | 5.26 | 163,680.00 | 50,712.00 |
| [-2.00,-1.00) | 10 | 14 | 17,409 | 45,819 | 63,228 | 27.53 | 72.47 | 90.38 | 15.56 | 20.16 | 4.48 | 174,090.00 | 63,228.00 |
| [-3.00,-2.00) | 11 | 15 | 18,090 | 64,724 | 82,814 | 21.84 | 78.16 | 93.92 | 21.98 | 26.40 | 3.56 | 180,900.00 | 82,814.00 |
| [-4.00,-3.00) | 12 | 16 | 18,411 | 86,673 | 105,084 | 17.52 | 82.48 | 95.58 | 29.44 | 33.50 | 2.85 | 184,110.00 | 105,084.00 |
| [-5.00,-4.00) | 13 | 17 | 18,642 | 115,752 | 134,394 | 13.87 | 86.13 | 96.78 | 39.32 | 42.85 | 2.26 | 186,420.00 | 134,394.00 |
| [-6.00,-5.00) | 14 | 18 | 18,742 | 153,151 | 171,893 | 10.90 | 89.10 | 97.30 | 52.02 | 54.80 | 1.78 | 187,420.00 | 171,893.00 |
| [-7.00,-6.00) | 15 | 19 | 18,812 | 184,058 | 202,870 | 9.27 | 90.73 | 97.66 | 52.52 | 64.68 | 1.51 | 188,120.00 | 202,870.00 |
| [-8.00,-7.00) | 16 | 20 | 18,899 | 209,170 | 228,069 | 8.29 | 91.71 | 98.12 | 71.05 | 72.71 | 1.35 | 188,990.00 | 228,069.00 |
| [-9.00,-8.00) | 17 | 21 | 19,006 | 230,130 | 249,136 | 7.63 | 92.37 | 98.67 | 78.17 | 79.43 | 1.24 | 190,060.00 | 249,136.00 |
| [-10.00,-9.00) | 18 | 22 | 19,104 | 248,115 | 267,219 | 7.15 | 92.85 | 99.18 | 84.28 | 84.28 | 1.16 | 191,040.00 | 267,219.00 |

FIG. 15

DATA ANALYSIS SYSTEM FOR CREATING A COMPARATIVE PROFILE REPORT

FIELD OF THE INVENTION

The invention relates to a system for analyzing databases and in particular a system for enabling enhanced direct marketing campaigns by weighted selection of potential customers from a prospect database.

BACKGROUND

It is known to conduct analysis of customer databases in order to try to enhance the results of marketing campaigns such as direct mail shot campaigns. However, such known systems are not very sophisticated, very time consuming in their analysis and or do not provide sufficiently successful results.

SUMMARY

Accordingly, an aspect of the invention seeks to provide improvements in such analysis systems and preferably to provide enhanced processing times as well as improved marketing campaigns.

According to an aspect of the invention there is provided a database analysis system comprising a store for storing databases, a user input and a user output, and a processor wherein the store comprises a first database having a plurality of records of prospective customers each record comprising predictor variables such as information about the prospective customer including contact details and customer characteristics, the predictor variables being discretely identifiable in separate fields, each predictor variable being categorised into two or more categories, such as household income level, the store further comprising a second database of responders comprising a plurality of records of predictor variables of selected customers such as actual respondents to an earlier survey, wherein the processor is adapted to compare the predictor variables for each of the records in the first and second database and to generate an output to the user output to enable the user to view the comparative result, such as in the form of a profile report.

Preferably the user output is configured to display the user viewable comparative result of the first and second database by different categories.

Beneficially, the processor can calculate a statistical significance for the comparative results of the first and second database and preferably wherein the statistical significance forms part of the user viewable display at the user output.

Also, the records of the first database are preferably compared to the records of the second database to create a comparative (or profile) report. Preferably the process of creating a profile report on the processor or analysis server is optimised to involve a maximum of two passes through the first, prospect database, independent of the number of variables. This can be achieved by the program maintaining a matrix of counts for every category of every variable for both analysis (responder database) and base sets (prospects database). The program should preferably ensure that transactional variables are correctly aggregated to the related person. This can be achieved by the program maintaining a matrix of Boolean flags for every category of every included variable. That is records related to one person may relate to one or more actual transactions for example in relation to a holiday company prospect database, an individual may have taken one, two or more holidays with that company, but the persons characteristics and therefore the primary predictor variables remain the same and in its simplest level, the individual should not have multiple entries for each transaction.

Preferably the user viewable comparative result comprises a category index value being a representation of a ratio of the percentage of the number of records for a given category in the second database over the total records for all categories for the associated variable, compared with the percentage of the number of records in the first database for the same category over the total number of records for all categories for the associated variable in the first database.

Also, the processor preferably drives the user output to provide a user viewable display comprising information representative of the relative penetration of a given category, preferably the representation is graphical, such as in the form of a bar chart representative, the size of which graphical representation is representative of the categories index value, the direction of which graphical is representative of, and or the colour of which graphical report is representative of the statistical significance.

Each record in the first database preferably has a unique identifier which preferably is in the form of an alphanumeric identifier and more preferably in the form of a unique reference number.

The second database is preferably a subset of the first database and each record in the second database comprises at least a unique identifier for each record in common with the same record in the first database, and preferably wherein the second database comprises records consisting only of a unique identifier common to records in the first database.

Additionally, the processor is preferably adapted to use weighted modeling analysis of characteristics of predictor variables and results from the comparison of the first and second database to enable selection of records in the first database.

The processor preferably scores each of the records in the first database based on the weighted modeling analysis and preferably wherein the score is a numerical value having for example three significant figures. Also, the processor can be adapted to band records in the first database into bands of scores, and or more preferably the processor is adapted automatically to band the records according to predetermined criteria, such as twenty four bands between −12 to −11, and 11 to 12. Alternatively, a user interface enables a user to determine the banding of the records.

Preferably, the system is adapted to hold out a proportion of the first database for analysis, thereby to prevent analysis using the weighted modeling analysis technique, and preferably wherein the proportion is set as a default such as 20%.

Preferably, the processor is adapted to assess the overall information gained for each variable based on a weight average of the significant weighted modeling analysis measures for all categories of a variable, and more preferably the processor is adapted to rank variables according to the information gain and enable selection of only the most important variables, and preferably wherein selection is automatic.

Also, a user interface can be adapted to enable a user to exclude one or more variables from the weighted modeling analysis of the data.

The processor can be configured automatically to select variables for use in the weighted modeling analysis based on at least one of the overall information gain, and maximum and minimum index values for the categories of a variable.

Also, the weighted modeling analysis is preferably hybrid model using both information theory and bayesian probability theory.

Preferably, the processor is adapted to conduct a comparison of the first and second databases to generate a comparative report and to conduct a weight of evidence analysis thereby to enable enhanced selection of individual records from the first database, and or wherein the processor is adapted to conduct a comparison of the first and second databases to generate a mathematical model to enable enhanced selection of individual records from the first database.

Moreover, the processor can be adapted to omit weighted modeling analysis calculations for categories with a statistical significance or z-score below a threshold value, preferably the threshold value is variable, and or the threshold value is 3 and or selectable by a user.

The system can comprise a server in communication with a user client computer system such as in a local area, wide area, or virtual private network, or other internet arrangement.

Preferably the system is adapted to generate an output to the user of selected records from the first database, and more preferably the processor is adapted to remove any records from the second database from the selected results database.

Another aspect of the invention provides a method of transferring marketing data between first (e.g. server) and second (e.g. client) computers comprising the steps of assigning a unique identifier to each record in a first marketing database, creating a second database of selected unique identifiers, and transferring the second database between the fist and second computers.

Preferably, the method also comprises the steps of enabling access to the first marketing database by one of the first and second computers and enabling extraction of records from the first marketing database using the unique identifiers from the second database. Preferably unique identifier comprises an alphanumeric string and preferably is a unique reference number.

BRIEF DESCRIPTION OF THE DRAWINGS

An example of a system according to the invention will now be described, by way of example only, with reference to the according schematic drawings, in which:

FIG. 2 is a table representing part of a prospects database, FIG. 3 is a table representing a responder database, FIG. 5 is a screen shot of a profile report, FIG. 8 is a screen shot of a profile report with an added column for the calculated PWE score and ZdExp, FIG. 9 is a table representing the prospect database with assigned PWE scores for each record, FIG. 10 is a screen shot of selection of responders, FIG. 14 is a screen shot of part of a segment gains table, FIG. 15 is a screen shot of part of a cumulative gains table.

DETAILED DESCRIPTION

Figure 1:
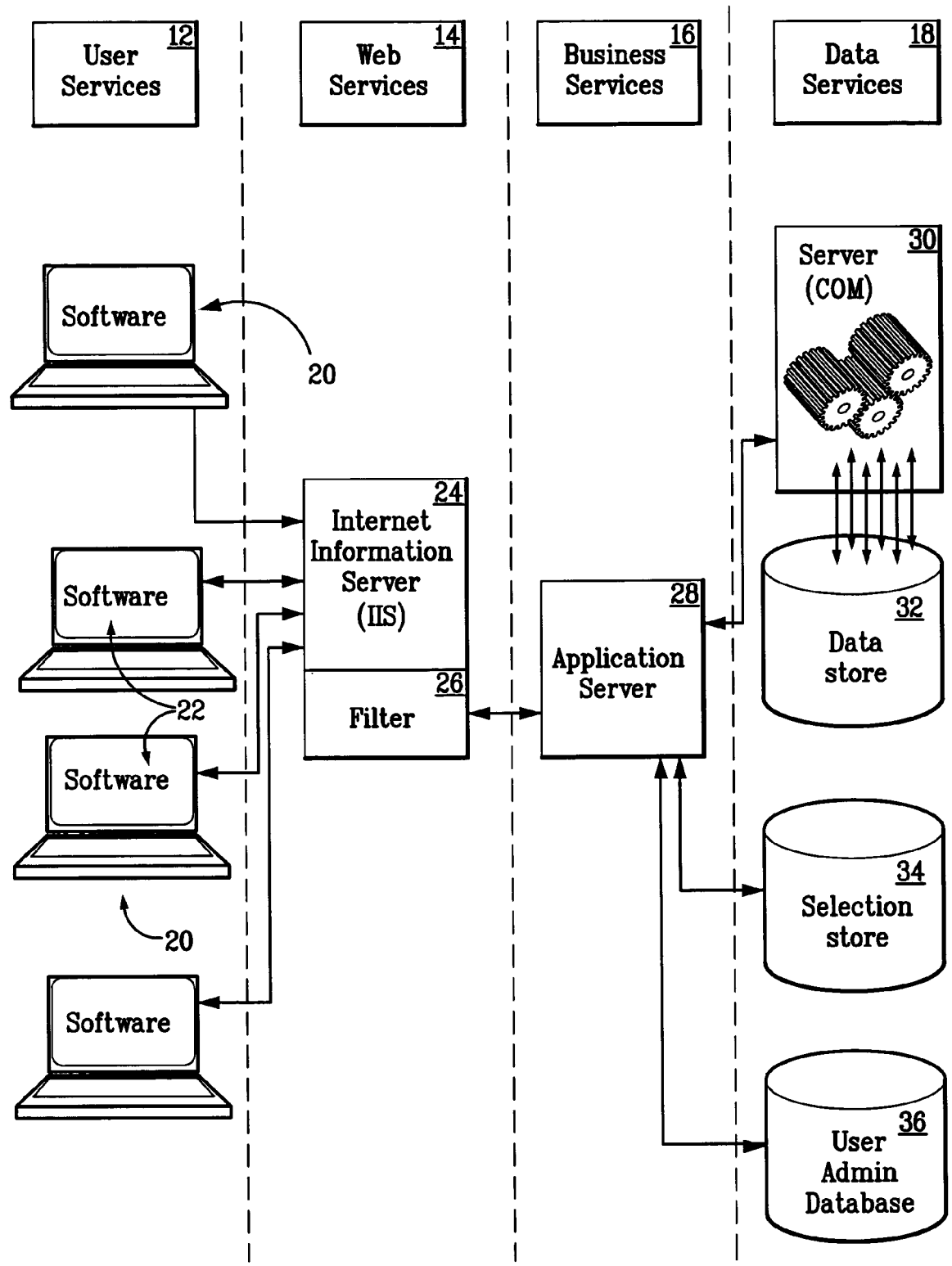
FIG. 1 is an overview of the architecture of a system according to the invention.

Referring to FIG. 1 there is shown a system 10 according to the invention comprising a user services section 12, a web services section 14, a business services section 16 and a data services section 18. These sections are described for ease of understanding the invention which provides, in this form, web client access via the web services section 14 to a data analysis system, here in the business section 16 and enables user manipulation and selection of data.

The user services section 12 comprises web client PCs 20 running a client software application 22, such as a Java applet that provides selection, analysis and reporting capabilities in a user-friendly graphical user interface environment. Preferably the software application 22 runs in a web browser and requires minimal or zero administration on the client PC, the latest application software and data installing and updating procedures can occur automatically from the web server.

The web services section 14 comprises a web server (WS) 24 and a web server filter 26. The WS 24 manages the communication and delivery of web pages to the browser of the client PCs 20. A suitable WS 24 is, for example, Microsoft Internet Information Server (IIS) which is the standard web server software application delivered as part of Windows 2000 and Windows NT.

The web server filter 26 provides routing and scheduling of selection and analysis requests to the application server 16. The web server filter 26 could be a plug-in ISAPI filter for the IIS 24 for example.

The business services section 16 comprises an application server 28 at the core of the present invention for managing data analysis requests.

The data services section 18 comprises an analysis server 30 an analysis data store 32, a selection store 34 and a user admin database 36.

The application server 28 processes requests for analysis and selection by calling the analysis server 30. User administration data is accessed from the user admin database 36. The results are formatted ready for transmission and display in the web client PCs 20. For efficient load balancing and easy administration the application Server can run as a service under Windows 2000 and NT for example.

The analysis server 30 is an analysis engine that uses optimised selection from the data store 32 to deliver extremely fast count, cross tab and profile results. The analysis server preferably uses a standard server activation model such as COM (Component Object Model) or SOAP (Simple Object Activation Protocol).

The analysis data store 32 is preferably a compressed and indexed, column orientated data store optimised to deliver extremely fast count, cross tab and profile results.

The user admin database can be, for example, a standard ODBC (Open Database Connectivity) database (such as Microsoft SQL Server or Access) that stores user administration and system usage data. In data vending systems the database also stores the pricing model and purchase details.

The selection store 34 is a simple file database or file directory storage area on the server that can be used to hold saved selection criteria, copies of exported data and possibly uploaded files from a user. Typically saved selection criteria require minimal storage, exported data and user files have storage requirements dependent on the number of records and size of user information or exported fields.

There are various physical configurations of the software application running on the client PCs 20. The Web Services 14, application server 16 and data services 18 may be installed on the same physical server or on separate machines linked by a fast network connection. It is also quite possible to install both client and server components on a standalone PC. It will be appreciated that each of the sections 12, 14, 16 and 18 comprise a computer in the form of a PC or a server having a processor capable of data analysis.

Referring to FIG. 2 there is shown a prospect database 40. The prospect database is a large set of prospect records 42 that may potentially be used for direct marketing. The prospect records 42 may be consumers or businesses, for instance. Examples of consumer prospect databases 40 include: customers of a financial services company e.g. bank, building society, insurer; customers of a utility or telecommunications company; comprehensive consumer lists built from electoral role, credit and questionnaire data and supplied by marketing data providers such as Experian and Equifax. Examples of business prospect databases include: business customers of a financial services company e.g. bank, insurer; business customers of a utility or telecommunications company, comprehensive business lists built from Companies House, credit and questionnaire data and supplied by marketing data providers such as Experian and Dun & Bra$_d$street.

For each record 42 in the prospect database 40 certain information is held such as: a unique reference or entry marker such as an alphanumeric string of characters and/or numbers, or simply a unique reference number (URN) 44 identifying each record 42 e.g. customer ID, account number; name and a$_d$dress details 46; transactional data gleaned from operational systems e.g. start dates, billing amounts, credit history, contact history; and a$_d$ditional data 48 such as postal sector, age, income, household type, house type etc. for consumers or postal sector, industry type, turnover, number of employees for businesses. This information is categorised into a number of fields 50 and preferably each record has an entry in each field although the entry may be missing.

The a$_d$ditional data 48 may be gathered from application forms or questionnaires or purchased from marketing data providers. Data protection legislation may limit the extent of information that may be held on individuals. The fields 50 created from the transactional data and a$_d$ditional data 48 provide the predictor variables that are analysed later. All variables' values can preferably be divided into a number of categories; numeric data is preferably "banded" into discrete categories.

In some cases the prospect database 40 is only a subset of the total data available, for example if a service is not available in a certain geographic regions or to certain age groups then these may be omitted from the prospect database 40. The following records 42 are an example of an excerpt from a prospect database 40 sourced from a fictional cable telecoms company and includes: Unique reference number (URN) 44, Name 52, Region 54 (full a$_d$dress details omitted for this example), months since start 56, subscription type 58 and the original application source 60, year of birth 62 (YOB), employment type 64 (Job), house type 66 (House) and banded income 68 (Income Band). In a data set there are often many more transactional data and a$_d$ditional data 42 fields 50.

Referring to FIG. 3 there is shown a responders database 70 representing records of responders 72. The responders 72 could be new records which are not in the prospect database 40 but are usually a subset of the prospect database 40 preferably represented by a set of unique reference numbers (URNs) 44 or other unique reference. Examples of responders 72 are: consumers or businesses who are customers for a certain product or service; consumers or businesses that have replied positively to a marketing promotion; consumers or businesses that form an important customer segment e.g. high spending, long-term, lapsed subscribers. The responders' subset 70 can be identified by a marker for their records 42 such as a set of URNs 44. The URNs 44 may be identified directly by running a query on the prospect database 40 or the URNs 44 may be captured as the replies are processed depending in the nature of the responders 72. If an externally sourced prospect database 40 is used it is necessary to use a name and a$_d$dress matching process to link the responders to URNs 44 in the prospect database. Data providers such as Experian and Dun & Bra$_d$street provide name and a$_d$dress matching as part of their services.

An a$_d$vantage of marking each record with a URN 44 or other similar unique reference is that a set of URNs 44, or similar, makes a relatively small data file that uniquely identifies the responders 72. Because no name and a$_d$dress or other data is attached the file is safe to transfer across the Internet. The URNs 44 uniquely identify the responders 72 in the prospect database 40.

The software application running on the client PCs 20 preferably includes a function to import URN files. This function allows the user to identify the location of the Responders on their PC 20 or selection store 34 and if necessary uploa$_d$the file across the internet.

Figure 4:
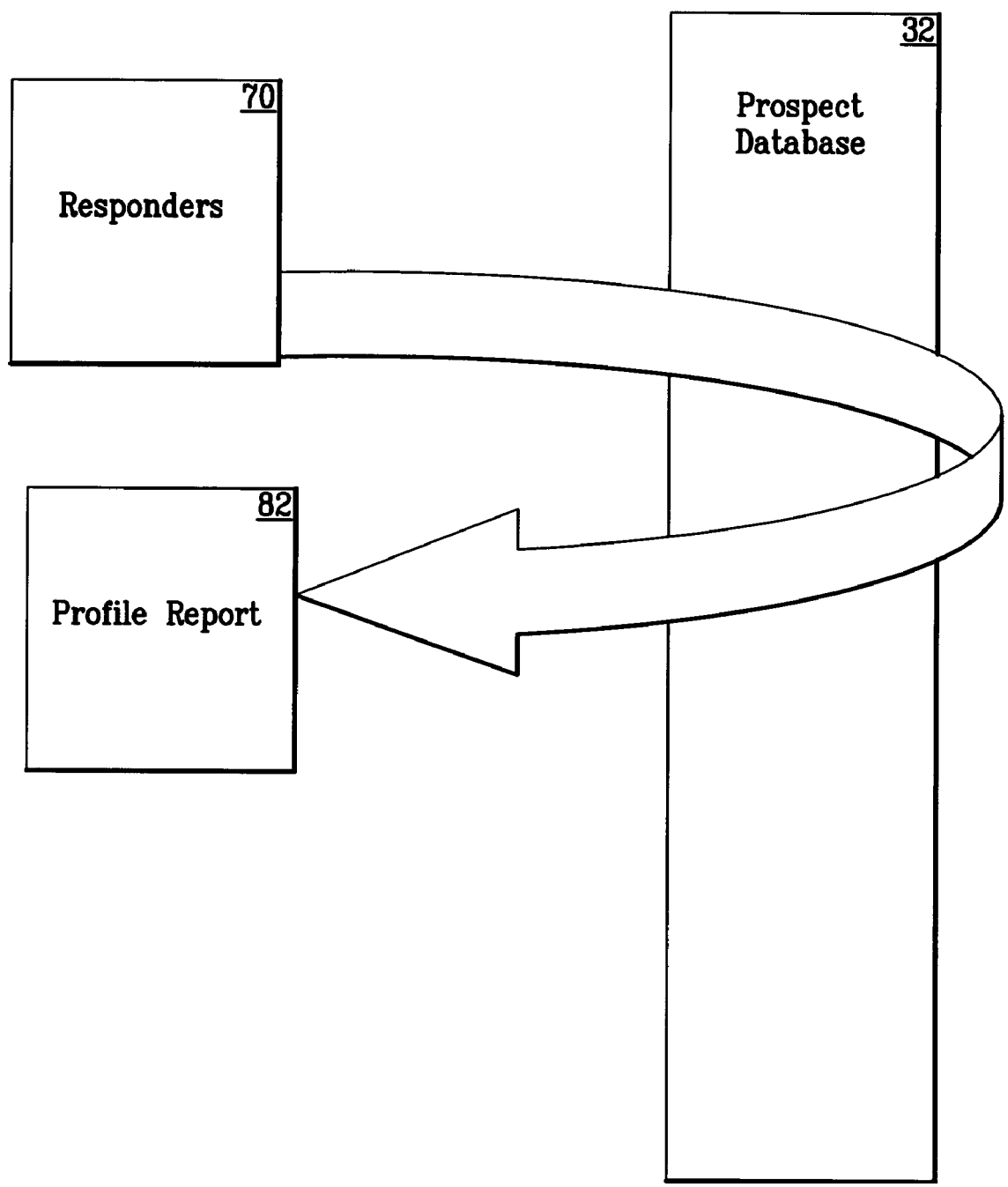
FIG. 4 represents the process of creating a profile report.

Referring to FIG. 4 there is shown a block diagram 80 of the process of comparing data in the responder and prospects databases to create a profile report. The software application "profiles" by comparing the responders 72 (the Analysis set) against the backdrop of the whole prospect database 40. The software application 28 generates a profile report 82 that highlights market sectors in which the responders 72 are over or under represented relative to the prospect database 40. This information can be used directly to guide marketing strategy and in particular more accurately determine prospect list selection. To generate a profile report 82 in the software application program, the user identifies the responders 70 as the Analysis set and requests the PC 20 to generate a profile report 82.

The process of creating a profile report 82 on the analysis server involves only a maximum of two passes through the prospect database, independent of the number of variables, typically requiring only a few seconds of processing time. This is possible since the program maintains a matrix of counts for every category of every variable for both analysis and base sets. The program also maintains a matrix of Boolean flags for every category of every included variable to ensure that transactional variables are correctly aggregated to the related person.

An example of a profile report 82 can be see in more detail in FIG. 5. The profile report 82 has a section for each included variable with a row for each category 84. The report shown was generated from the same source data as the prospect database 40 examples. For each category 84 can be rea$_d$the number and percentage of records 34 in the responders 70 set (Analysis) and the prospect database 40 (Base). The remaining columns 86, comprising columns for the index 88, z-score 90 and Penetration 92 show the market penetration.

The Index 88 is the ratio Analysis %/Base % multiplied by one hundred. An Index 88 of over one hundred shows over representation in the category; less than one hundred shows under representation.

The standard z-score 90 indicates the statistical significance. The z-score 90 of a proportion is a standard statistical result. The magnitude of the z-score 90 can be interpreted as the number of standard deviations of the Index 88 away from the expected value of the proportion if the Analysis set was a random sample. The sign of the z-score 90 indicates the direction of the deviation from the expected value, above or below.

The Index 88 is illustrated by the size and direction of the Penetration graphic 92 and the z-score 90 is illustrated by the colour, such as from yellow (low significance i.e. low z-score) to red (high significance i.e. high z-score).

In this example it can be seen that responders 72 are over represented in the 10–15 k and 15–20 k income bands but under represented in higher income bands relative to the base population.

It is difficult to aggregate the information in the profile report to rank the prospect database and hence select the best new prospects for marketing. For example, just choosing the intersection of the best categories is not usually a good strategy, as often very few prospects will have all of these attributes. Instead the invention produces a predictive weight of evidence (PWE) modelling technique, described later, which uses the characteristics of the predictor variables (e.g. House Type, Income Band) and the results of the profile report 82 to develop a balanced model and score the prospect database 40.

Figure 6:
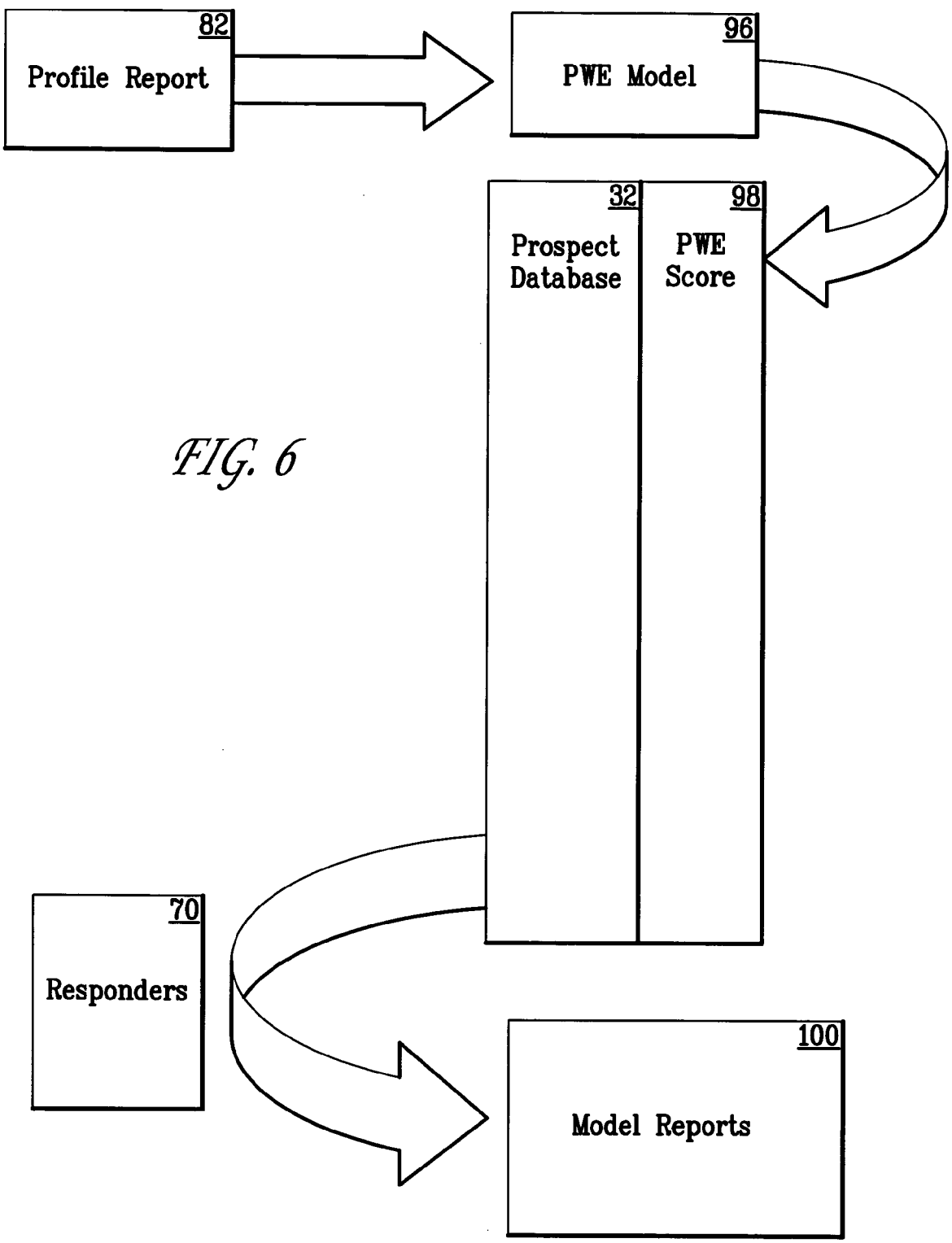
FIG. 6 represents the process of applying the PWE model to records in the prospect database.

Referring to FIG. 6 there is shown a block diagram 94 representing the process of applying the PWE model 96 to records in the prospect database 40. The software application 28 uses the predictive weight of evidence (PWE) technique to extract a predictive classification model directly from the profile report 82. The technique is fast, automatic and requires a minimum of user input. The profile report 82 is easily read and therefore the marketing analyst can understand the factors included in the model. The PWE model 96 is used to score all the records 42 in the prospect database 40 based on the classification information "learned" from the profile report 82. The score is used to rank and pick off the best prospects for marketing and can displayed as an extra column 98 in both the prospect database 40 and the profile report 82.

Model Reports 100 to illustrate the potential gains made by using the PWE model 96 can be generated by measuring how well the scores predict the known responders 72 and are described in detail later.

Before applying the PWE model 96 a hold out sample can be specified to reserve some data so that a later test and report on the model using a sample of data that was not used to build the model can be conducted. The default is to build the model using 80% of the data and report using the remaining 20%.

Figure 7:
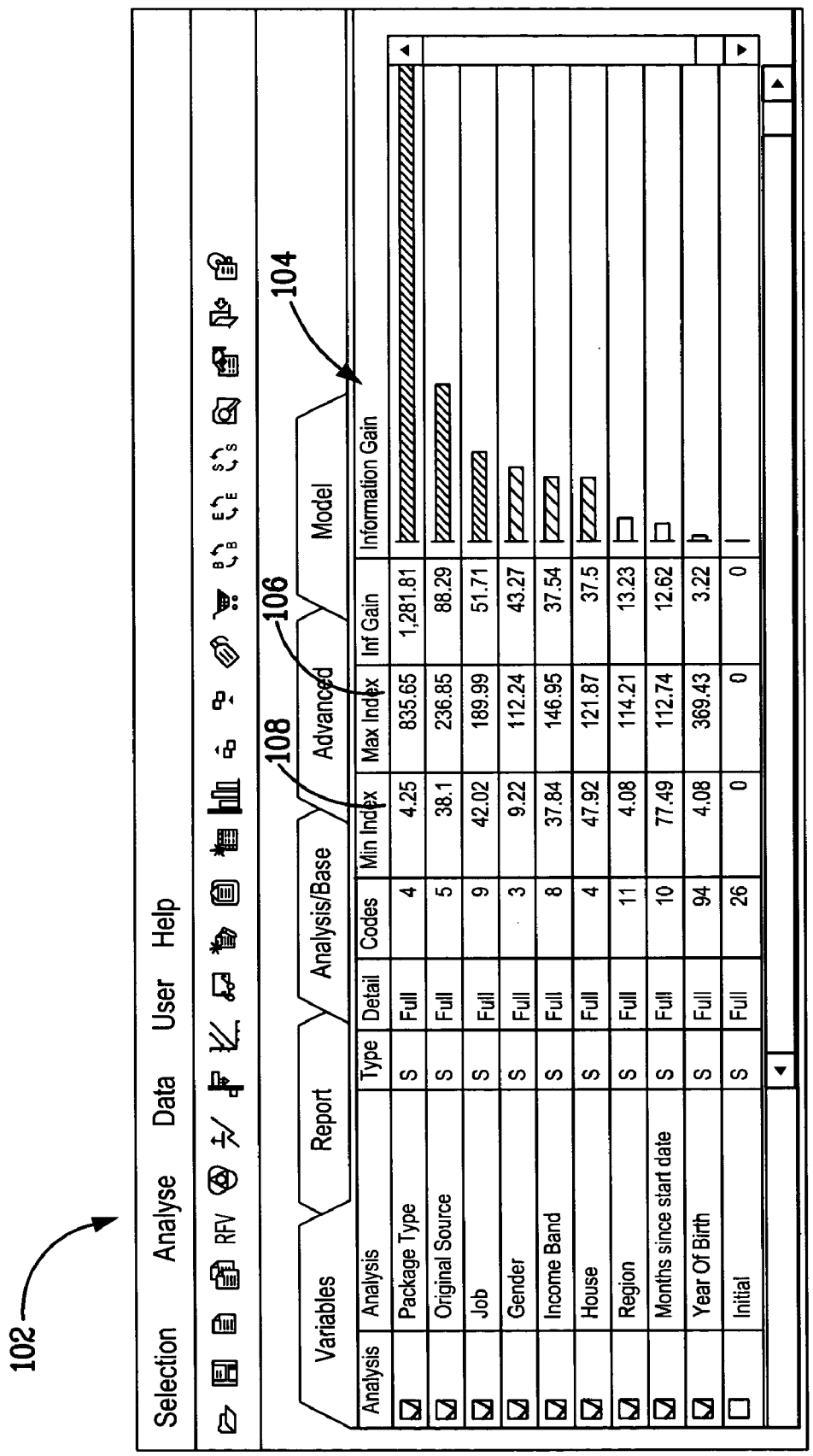
FIG. 7 is a screen shot of the variables (also known as "columns", or "data fields") of the responder database ranked by Information Gain.

The software application 22 displays a table 102 of all the variables analysed in the profile report 32 as is shown in FIG. 7. The information gain 104 ranks the variables by their power in predicting whether a record is a Responder or not.

The overall variable information gain 104 is calculated as the weight average of the significant PWE measures for all categories of the variable. The weights are preferably the category proportions in the prospect (second) database. The information gain 104 and the maximum and minimum index 106 and 108 can be used to decide which variables to include in the model 96. At this point the user may also apply background knowledge of the data and business to exclude variables from a group that represent the same information e.g. to not include both postal code and town; to include only the business classification with the highest information gain. This manual intervention is optional—the PWE technique automatically gives most weight to the most important variables. Once the variables have been chosen the user simply inputs a request to the PC 12 to build the model 96.

The Predictive Weight of Evidence (PWE) model 96 is a hybrid model building technique based on information theory and Bayesian probability, to extract predictive information from the profile report 82 to create a score for each prospect record in the prospect database 40 indicating the propensity for the record 42 to be a responder. For each record 42 in the prospect database 40 the category for each predictor variable can be read. With knowledge of this category the corresponding predictive weight of evidence (PWE) 98 measure from the corresponding category row in the profile report 82A as shown in FIG. 8 can be read also. If the category is not known (missing or invalid) for the prospect record a PWE measure of zero is assigned.

As an example and continuing to refer to FIG. 8, if the prospect record has Income Band "10–15 k" 110 the PWE is 0.60. This is interpreted as evidence of 0.60 for the record being a responder. If however the prospect record has Income Band "40–50 k" 112 the PWE is −0.58. This is interpreted as evidence of 0.58 against the record being a responder. The examples from the prospect database 40 and responders database 70 given earlier seem to suggest that responders 72 come from the lower income bands. The PWE method tests the relationship statistically (using the full files) and produces the PWE measures 98 that indicate the strength of the relationship relative to the other predictor variables.

The PWE category score is derived from the numbers in the profile report 82 by using information theory to consider the evidence for and against membership of the responders' set 70 given membership of the category.

The PWE score 98 is based on the predictive weight of evidence that membership of a variable category $A_i$ gives that a record should be classified as a Responder. In probabilistic terms the interest is in the probability of the "classification to Y (Responder)" or "classification to N (Not Responder)" event occurring.

The PWE category score is developed (initially for one variable, A) by considering the difference in the gain of information when a record characterised by category $A_i$ is assigned to Y ("Responder") as opposed to the alternative class N ("Not Responder").

Initially the PWE can be calculated for one variable A.

$$PWE(Y/N|A_i) = G(Y|A_i) - G(N|A_i)$$

Where i is the index of the category e.g. 15–20 k and G is the information gain.

For example, if we know that a prospect has income band 10–15 k this provides an amount of "evidence" that the record may be a Responder and similarly "evidence" that the record is Not Responder. The PWE is the difference between these two values.

To calculate $G(Y|A_i)$ the Information Gain on classification to class Y based on membership of category $A_i$ we need:

the information value (for classification to class Y) of knowing Y is I (Y) where $$I(Y) = \log_2\{1/P(Y)\} \text{ bits (from Shannon's Information Theory)}$$

where P(Y) is the probability of Y i.e. probability that any prospect is a responder;

−360 and the information value (for classification to class Y) of knowing Y|$A_i$ is I (Y|$A_i$) where $I(Y|A_i) = \log_2 \{1/P(Y|A_i)\}$ bits (from Shannon's Information Theory)

where P(Y|$A_i$) is the probability of Y given membership of category $A_i$ i.e. probability that any prospect with category value of variable A=$A_i$ is a Responder (e.g. probability that prospect is a Responder given that Income Band=10–15 k.).

G(Y|$A_i$)=information gain on classification of Y provided by knowledge that the category value of variable A is =$A_i$ $G(Y|A_i)$=value of information of $Y|A_i$–value of information of Y $G(Y|A_i) = I(Y|A_i) - I(Y)$ Note that knowledge that the category value of variable A is =$A_i$ (e.g. knowledge that income band is 10–15 k) will at worst give us no information therefore I (Y|$A_i$) will always be greater than I(Y) hence G(Y|$A_i$) is always positive.

$G(Y|A_i) = \log_2\{1/P(Y|A_i)\} - \log_2\{1/P(Y)\}$ $G(Y|A_i) = \log_2\{P(Y|A_i)/P(Y)\}$ and similarly for classification to class N, $G(N|A_i) = \log_2\{P(N|A_i)/P(N)\}$ The probabilities are estimated using the observed frequencies in the profile report 82.

P(Y) and P(N) are estimated from the totals.

$P(Y) = y+/t+$ $P(N) = n_+ t_+ = (t_+ - y_+)/t_+$

Where $y_+$ is the sum of Yes (Analysis) records and $t_+$ is the sum of total (Base) records.

P(Y|$A_i$) and P(N|$A_i$) are estimated from the ith row counts.

$P(Y|A) = y_i/t_i$ $P(N|A_i) = n_i/t_i = (t_i - y_i)/t_i$

Where $y_i$ is the Yes ("Analysis") count of category i and $t_i$ is the total ("Base") count of category i.

Thus the weight of evidence provided by knowledge that predictor variable A taking value $A_i$ for or against the assignment of the record to class Y is given by:

$PWE(Y/N|A_i) = G(Y|A_i) - G(N|A_i)$ $PWE(Y/N|A_i) = \log_2\{P(Y|A_i)/P(Y)\} - \log_2\{P(N|A_i)/P(N)\}$ $PWE(Y/N|A) = \log_2\{P(N)P(Y|A_i)/P(Y)P(N|A_i)\}$ Substituting the probability estimates gives $PWE(Y/N|A_i) = \log_2\{y_i(t_+ - y_+)/y_+(t_i - y_i)\}$ Example: Income Band 10–15 k in the above profile report:

−360 $PWE(Y/N|\text{``15–20 k''}) = \log_2\{y_i(t_+ - y_+)/y_+(t_i - y_i)\}$ $PWE(Y/N|\text{``15–20 k''}) = \log_2\{4496 \times (313694 - 19262)/19262(57668 - 4496)\}$ $PWE(Y/N|\text{``15–20 k''}) = 0.37$ (to 2dp)

The weight of evidence measure is displayed in the PWE column of the profile report 82A.

The weight of evidence in this case is positive; knowledge that value (Income Band)="15–20 k" gives positive evidence of magnitude 0.37 that the record should be classified under Y.

In general PWE (Y/N|$A_i$) is positive if the information that value (A)=$A_i$ provides positive support to predicting a Y classification (Responder). PWE (Y/N|$A_i$) is negative if the information that value (A)=$A_i$ provides evidence against predicting a Y classification.

The overall predictive classification score (PWE Score) for a record is calculated by summing significant PWE contributions from all included predictor variables:

PWE Score=Sum ([PWE]$_{v,i}$) over all included predictor variables v.

Where [PWE]$_{v,i}$ is the evidence provided by knowledge of the category i for variable v given by:

[PWE]$_{v,i}$=PWE for variable v, category i, if |ZdExp$_i$|>$Z_{crit}$.

[PWE]$_{v,i}$=0, if |ZdExp$_i$|<=$Z_{crit}$.

[PWE]$_{v,i}$=0, if category unknown for variable v

ZdExp is a z-score measure of statistical significance relevant to the category results used to calculate the category PWE.

Zcrit is the Threshold Zscore Value for significance that is specified by the user. The default value is 3 that corresponds to a confidence level of over 99.5%

Notice that PWE contribution is omitted from the sum if the corresponding ZdExp is below the critical value i.e. the category does not give a significant deviation from the expected value. No PWE contribution is added if the category is "unknown".

Notice that the only user inputs to the modelling process are the list of included variables and $Z_{crit}$ the ZdExp threshold for inclusion.

The scoring model is improved by omitting PWE contributions that arise from categories that are not statistically significant. The adjusted residual ZdExp can be used to test the significance of the deviation of the observed frequency from the expected frequency.

The method is based on the properties of the standardised residual $z_{ij}$ for a cross tab given by:

$z_{ij} = (f_{ij} - e_{ij})/\sqrt{e_{ij}}$

Where $f_{ij}$ is the observed frequency and the expected frequency is estimated as $e_{ij} = f_{i+}f_{+j}/N$ where $f_{i+}$ and $f_{+j}$ are the cross tab marginal totals for the ith row and the jth column respectively and N is the grand total.

Haberman (1973) investigated the sampling properties of $z_{ij}$. The maximum likelihood estimate of the asymptotic variance, $n_{ij}$, of $z_{ij}$ is:

$n_{ij} = (1 - f_{i+}/N)(1 - f_{+j}/N)$

Under independence, the adjusted residual $d_{ij}$ has an approximately standard normal distribution.

$d_{ij} = z_{ij}/\sqrt{n_{ij}}$

So, $d_{ij}$ is a special z-score showing the significance of the deviation from the expected value, hence the designation ZdExp.

Now taking the more specific case of the Responder (Analysis) column and the i'th category row in the profile report:

$[zdexp]_i = z_i/\sqrt{n_i}$ where $z_i = (y_i - e_i)\sqrt{e_i}$ where $e_i = t_i y_+/t_+$ and $n_i=(1-t_i/t_+)(1-y_+/t_+)$.

Large positive values of $[ZdExp]_i$ indicate that the observed frequency is significantly greater than the expected value. Large negative values of $[ZdExp]_i$ indicate that the observed frequency is significantly less than the expected value.

For a chosen significance level $a_d$ there are three cases depending on the value of $[ZdExp]_i$ relative to the standard normal deviate $Za_d$:

$$[ZdExp]_i > +Za_{d/2}$$

A significant proportion of the records classified Y have classification $A_i$. It is more likely that a record with value $(A)=A_j$ will belong to Y. In other words $P(Y|A_i)>P(Y)$ with $(1-a_d)\times100\%$ confidence.

For example $[ZdExp]_3=18.34$ so $P(Y|"15–20 k")>P(Y)$ i.e. "the probability of Y given "15–20 k" Income Band is significantly greater than the overall probability of Y."

$$[ZdExp]_i < -Za_{d/2}$$

A significant proportion of the records classified $B_j$ have values of A other than $A_i$. It is less likely that a record with value $(A)=A_i$ will belong to Y. In other words $P(Y|A_i)<P(Y)$ with $(1-a_d)\times100\%$ confidence.

For example $[ZdExp]_5=-4.60$ so $P(Y|"30–40 k")<P(Y)$ $$-Za_{d/2} < [ZdExp]_i < +Za_{d/2}$$

The adjusted residual $[ZdExp]_i$ is not significant. Knowledge that a record is characterized by $A_i$ does not provide significant information about the classification to Y or N.

For example $[ZdExp]_4=1.68$ so we conclude that $P(Y|"20–30 k")>P(Y)$ but the result is not significant at $a=0.05$ (since $z<1.96$)

The criteria used for selecting category rows that provide significant information for classification of the target variable is therefore:

$$|[ZdExp]_i| > Z_{crit}$$

where $Z_{crit}$ is a parameter expressing the significance required in order to include a category contribution into the model. For example with significance $a_d=0.05$ the critical value of $Z_{crit}$ is 1.96.

The PWE score is calculated and banded and stored for each record in the prospect database using a single pass through and prospect database. This is achieved, for every record, by looking up the category for each included predictor variable, reading the corresponding PWE value and aggregating to give the PWE score for the record.

Referring to FIG. 9 there is shown the prospect database 40 with added PWE score 98 column. The result of running the PWE model 96 is a score for every prospect record in the prospect database 40 calculated according to each individual's characteristics. The PWE score is initially calculated as a real number (e.g. 5.678) but is then also automatically banded (e.g. 5.0 to 6.0) to provide a segmentation of the data set by propensity to be classified as a Responder. The PWE score band is then appended to the prospect database 40 as a new data field 50 in the analysis data store or a related database. The whole process of scoring, banding, appending occurs automatically and rapidly controlled from the software application 22 on the clients PC 20 using the analysis server 30 without user intervention. The size of the bands, however, can be adjusted by the user so, for example, the score of 5.678 could be banded as 5.0 to 5.5 or 4.0 to 6.0.

Bands with high positive scores are usually the best segments for marketing, as they include prospect records with the highest propensity to be a responder. Bands with high negative scores are usually the worst segments for marketing as they include prospect records with the lowest propensity to be responders 72.

The best prospects with the highest scores can be selected by simply selecting the top ranking bands 114—in FIG. 10 the bands for scores greater than 2.0 have been selected. There are more sophisticated methods of choosing the optimum number of bands using the model reports 100.

In some cases the original responders 72 will be excluded from the final selection. This would be the case if the responders 72 were already customers for the product to be marketed. Responders 72 can be easily excluded by referencing the URN 44 file or other relevant marker as an exclusion criterion in the application 22 selection.

Figure 11:
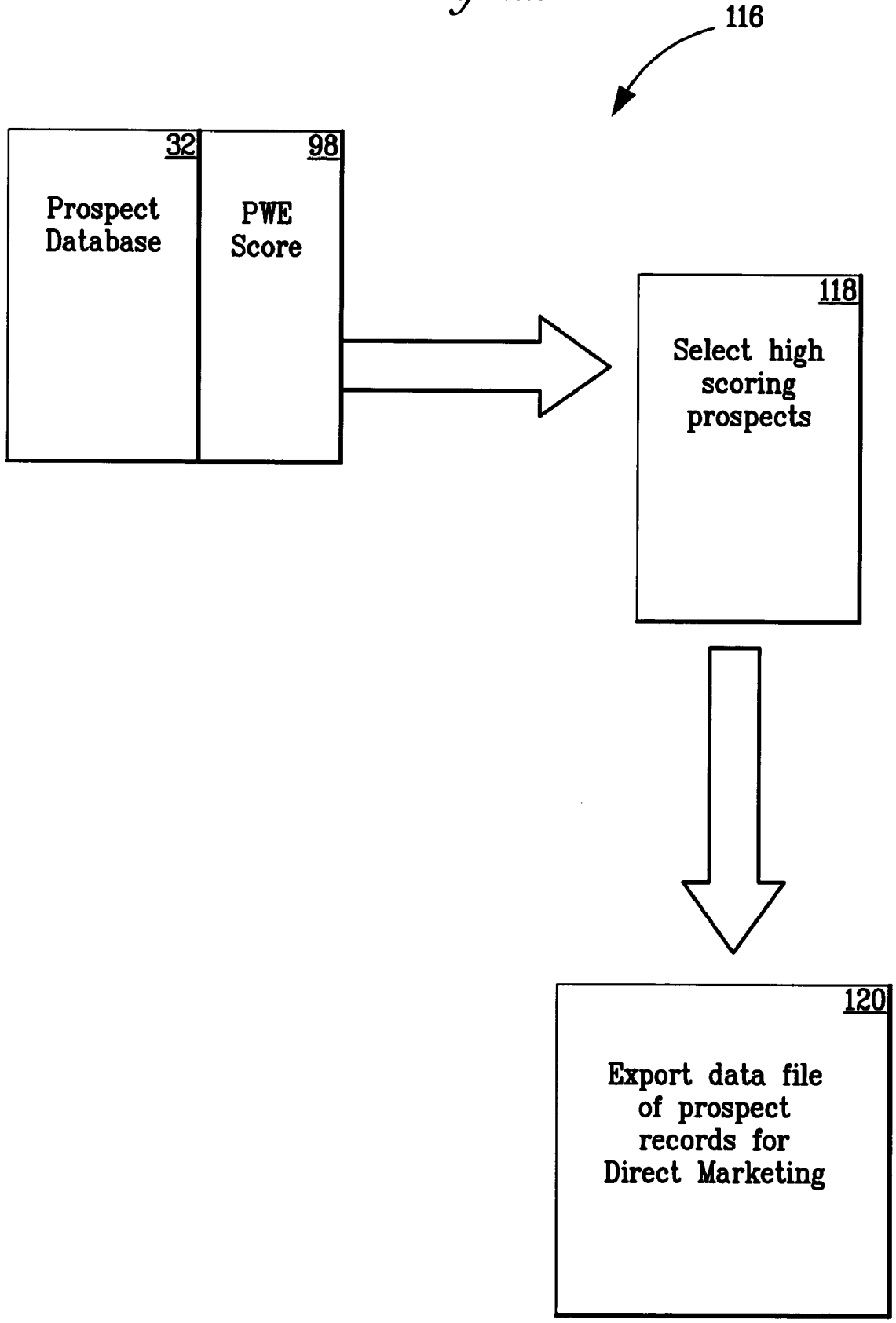
FIG. 11 represents the process of selecting prospects by PWE score.

FIG. 11 shows a block diagram 116 of the process of selecting by score segment. After the selected prospects 118 are chosen an export function 120 of the software application 22 is then used to extract the selected prospect records as a file (in a variety of standard formats). The export file can be compressed and password encrypted and transferred to the client PC 20 file system.

If the prospect database 40 is provided by an external data supplier (e.g. Dun & Bradstreet, Experian) the prospect records to be extracted may have to be licensed for use. In this case the software application 22 invokes a "buy data" function to process the data order and collect payment against a credit card, credit account or other suitable means.

The software application 22 can display model reports 100 [created by the analysis server] using gains tables and charts to explore the validity and potential of using the PWE model 96 for marketing. These model reports 100 can also be used to select the score bands to extract for marketing.

Figure 12:
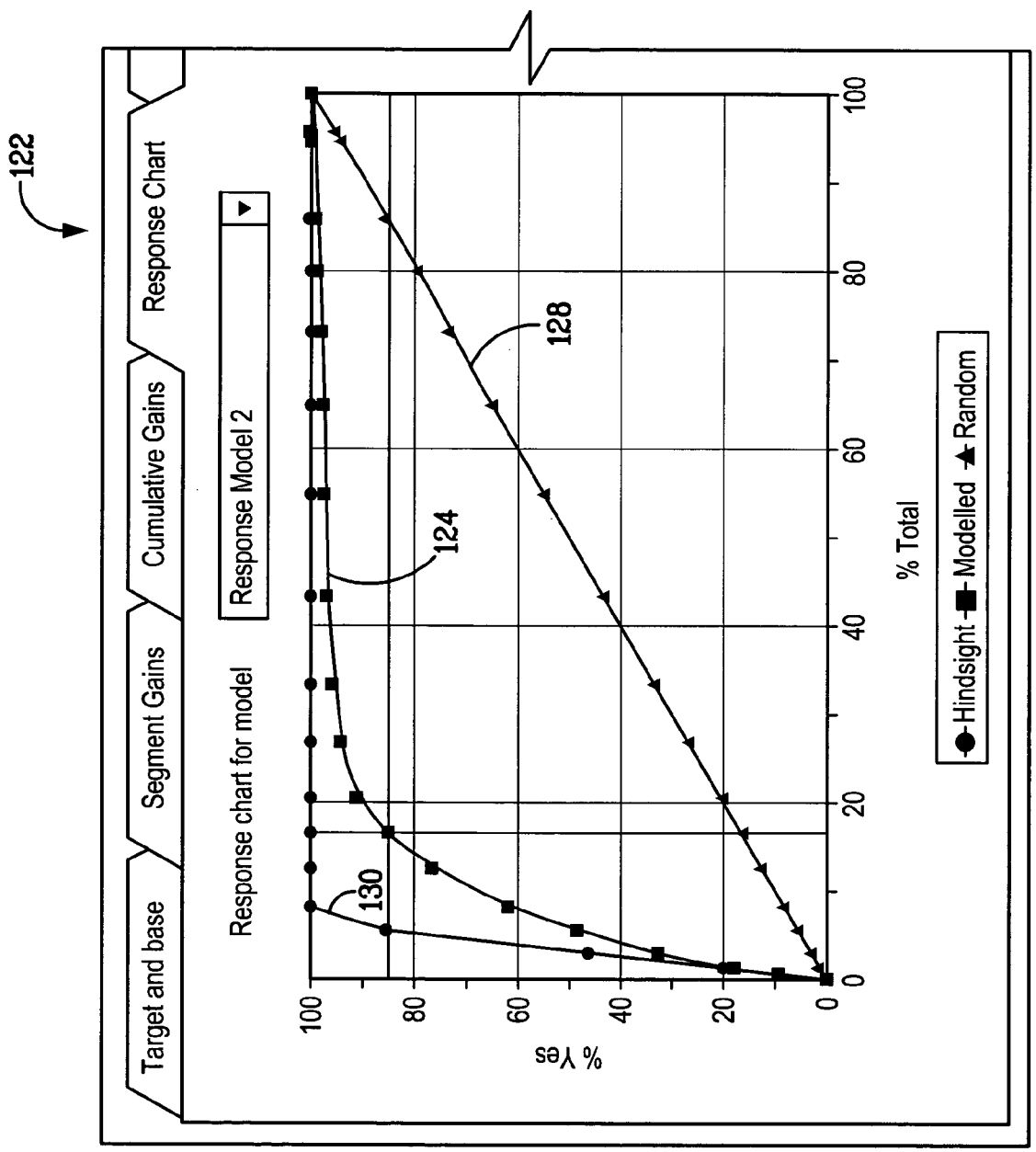
FIG. 12 is a screen shot of a response chart.

In FIG. 12 there can be seen a response chart 122 that shows how well the model 98 predicts the Analysis set (the original Responders) 70 from the base population.

Line 124 shows the effect of marketing using the best scoring segments first. In this case marketing to the top 20% of the total base selection captures around 90% of the responders 72 (labelled % Yes).

Typically the user will concentrate marketing efforts on the best 5–30% of the base population where the model curve is steepest.

Without the model 96, just picking prospects at random the plot would follow line 128 A user marketing to 20% of the prospects would expect to get 20% of the responders 70.

Line 130 shows the theoretical best model (hindsight) that would be obtained only by apriori knowledge of the responders.

All three lines meet at 0% and 100% since, 0% represents marketing to nobody and consequently getting no responses, while 100% represents marketing to all prospects and consequently getting the total number of responders 70.

Figure 13:
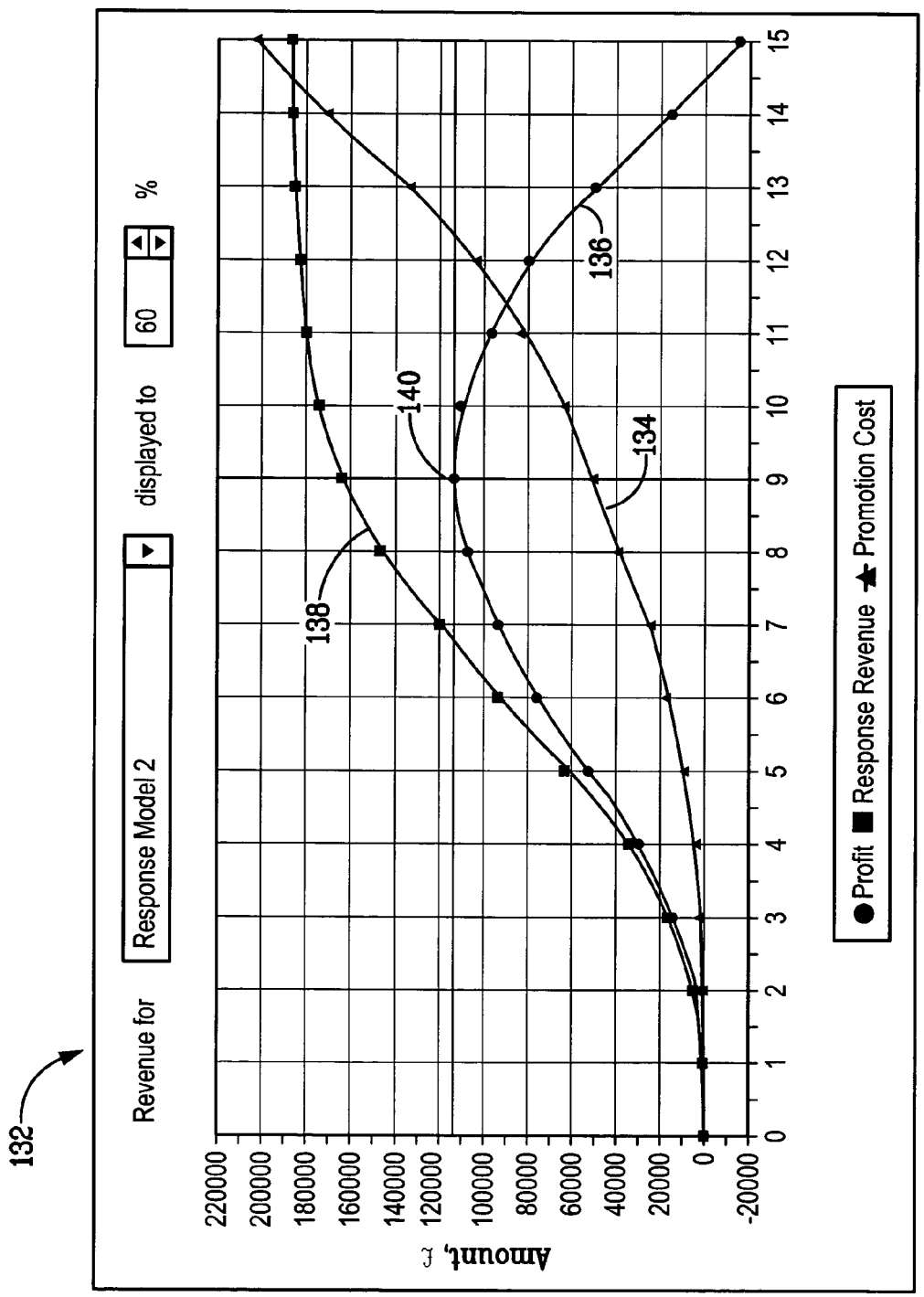
FIG. 13 is a screen shot of a revenue chart.

By taking into account the costs of marketing and expected conversion rates, that can be entered using the client software application 22, profit and revenue charts can be calculated to show the possible financial gains. Such a revenue chart 132 is shown in FIG. 13.

All three lines meet at 0% and 100% since, 0% represents marketing to nobody and consequently getting no responses, while 100% represents marketing to all prospects and consequently getting the total number of responders 70.

By taking into account the costs of marketing and expected conversion rates, that can be entered using the client software application 22, profit and revenue charts can be calculated to show the possible financial gains. Such a revenue chart 132 is shown in FIG. 13.

The revenue chart 132 shows the result of marketing to successive segments from best to worst in terms of expected costs and revenues. The estimated fixed and per record costs used to calculate financial projections are user specified for the report.

The revenue chart 132 shown in FIG. 13, as an example, has the following properties: that as more segments are marketed the cost line 134 increases continuously; the revenue line 136 initially increases but then flattens off after the majority of responders 72 (and therefore revenue) have been captured; the profit line 138 is the difference between the revenue and cost increasing initially with the revenue produced by the best segments but later dragged down dramatically by the increasing costs of marketing to the worst segments resulting in a profit curve with a single maximum value, indicating the optimum number of segments to include; the point at which the revenue and cost lines meet is the maximum revenue that can be achieved without making a loss; and the best segments contain relatively few prospects and therefore although the gain is high they produce little revenue.

The black cross hair lines 140 here indicate the selection of segments that optimizes the Profit. A user can alter the selection by clicking on a point to move the cross hair 140 to that segment. A lower or higher than optimum profit may be preferred due to, for example, restrictions on cost or requirements to maximize revenue respectively.

Figure 16:
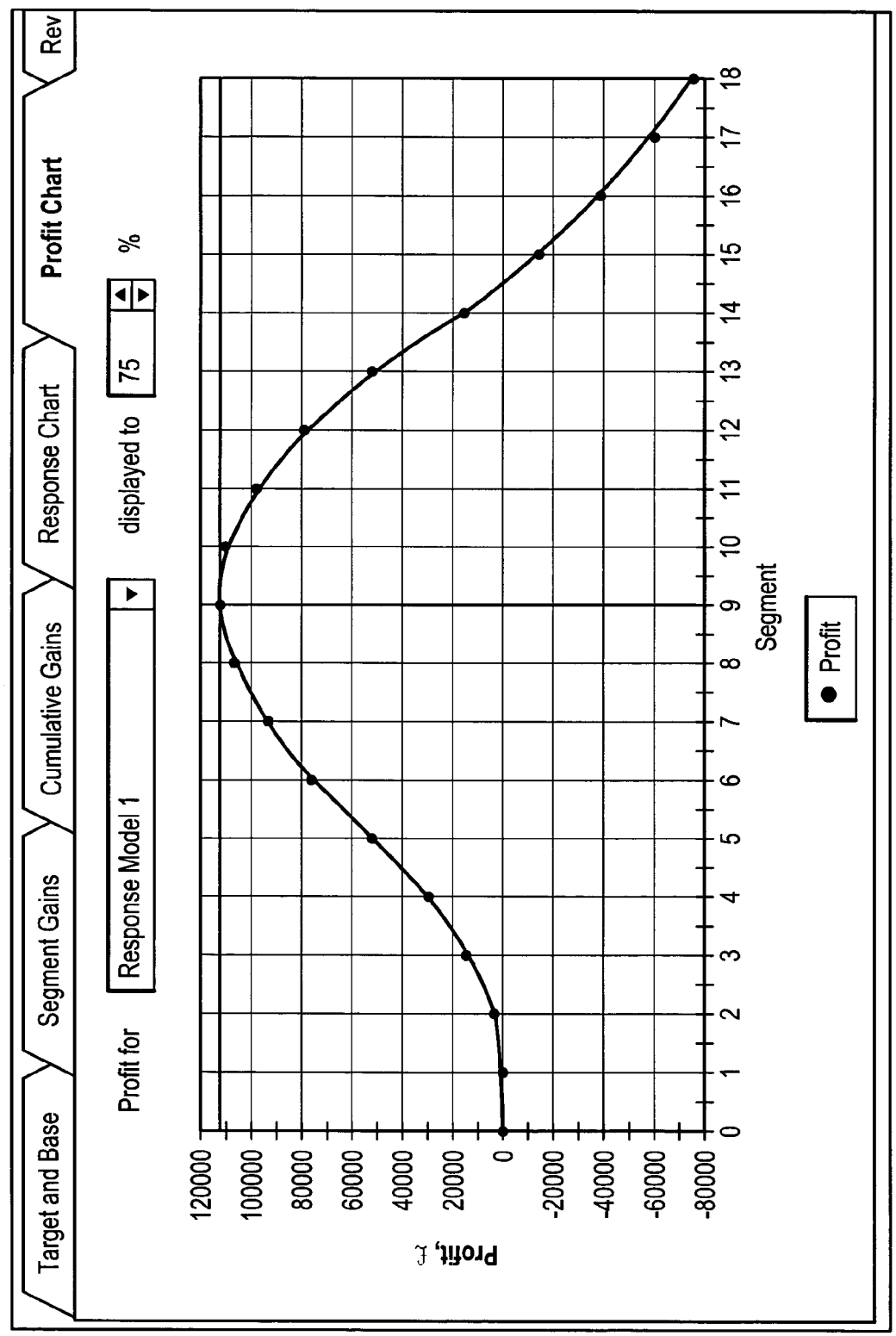
FIG. 16 is a graph of profit versus segment.

In this case the cross hair can be repositioned with a mouse click to change the segment selection to meet a profit or revenue objective. The cross hairs on all the charts are linked. Repositioning the cross hair on the revenue chart 132, moves the cross hair to the corresponding point on the profit chart shown in FIG. 16 and response chart 122 (and vice versa).

Any selection that is made with the cross hair 140 is highlighted on the cumulative gains table shown in FIG. 15 and can be automatically translated to a selection on the banded score.

The Segment Gains Table shown in FIG. 14 shows the result of marketing to each segment ranked by score. In the segment gains table:

Model Grade is the ranking of the segment from best to worst.

Yes is the actual number of Yes responses in the segment. This is the number of records in the Analysis Selection with scores in this segment.

−360No is the actual number of No responses in the segment. This is the number of records not in the Analysis Selection but with scores in this segment.

Total is the total number of prospects in the segment (Yes+No). This is the number of records in the Base Selection with scores in this segment.

Yes % is the percentage of Yes responses in the Total number of prospects in the segment.

No % is the percentage of No responses in the Total number of prospects in the segment.

% Yes is the percentage of Yes responses out of the total number of Yes responses in the Base Selection.

% No is the percentage of No responses out of the total number of No responses in the Base Selection.

% Total is the percentage of records in this segment compared to the whole Base Selection. This measure shows the relative size of the segment.

The Gain indicates the performance of the segment and is the ratio of the Yes % for this segment with the overall Yes %.

The Revenue is the number of Yes responses multiplied by the per-record revenue (from Options). It is the total gross revenue from selling to the Yes responders.

The Cost is the expense of marketing to the Total number of prospects in this segment using the per-record and fixed costs from the Options page.

Profit is the Revenue—Cost and is your estimated projected profit for marketing to this segment.

Revenue ROI is the revenue return on investment estimate for marketing to this segment. If the Revenue ROI is 10.0 then you make $10 of gross revenue for every $1 spent on marketing to this segment.

Profit ROI is the profit return on investment estimate for marketing to this segment. If the Profit ROI is 5.0 then you make $5 of profit for every $1 spent on marketing to this segment.

The Cumulative Gains Table [FIG. 15] shows the cumulative result of marketing to each successive segment in the segment gains table. The columns of the cumulative gains table is the source data that is graphed in the response chart 122, profit chart, and revenue chart 132. In the cumulative gains table:

Model Grade is the ranking of the segment from best to worst.

Yes is the actual accumulated number of Yes responses up to and including the segment.

No is the actual accumulated number of No responses up to and including the segment.

Total is the total accumulated number of prospects up to and including the segment (Yes+No).

Yes % is the percentage of Yes responses in the Total number of prospects up to and including the segment.

−360No % is the percentage of No responses in the Total number of prospects up to and including the segment.

0% Yes is the percentage of Yes responses up to and including the segment out of the total number of Yes responses in the Base Selection.

% No is the percentage of No responses up to and including the segment out of the total number of No responses in the Base Selection.

% Total is the percentage of records up to and including the segment compared to the whole Base Selection. This measure shows the relative size of the segments selected so far.

The Gain indicates the performance of the selection up to and including the segment. It is the ratio of the Yes % up to and including the segment with the overall Yes %.

The Revenue is the number of Yes responses multiplied by the per-record revenue (from Options). It is the total gross revenue from selling to the Yes responders up to and including the segment.

The Cost is the expense of marketing to the Total number of prospects up to and including the segment using the per-record and fixed costs from the Options page.

Profit is the Revenue—Cost and is your estimated projected profit for marketing to all prospects up to and including the segment.

Revenue ROI is the revenue return on investment estimate for marketing to all prospects up to and including the segment. If the Revenue ROI is 10.0 then you make $10 of gross revenue for every $1 spent on marketing.

Profit ROI is the profit return on investment estimate for marketing all prospects up to and including the segment. If the Profit ROI is 5.0 then you make $5 of profit for every $1 spent on marketing.

The revenue chart 132 and profit chart plot the segment number on the horizontal axis. An alternative offered by the client software application 22 is to plot the percentage of the total prospect records on the horizontal axis.

A further option for these charts is to limit the extent of the horizontal scale to a percentage of the total prospect records. The default is to display only up to 75% but this can be changed dynamically by changing the "display to" number on the report display. Often the last section of the horizontal scale is not interesting and by excluding it the chart is made more readable in the area covering the most profitable segments.

I claim:

1. A database analysis system comprising:
a store for storing databases,
a user input and a user output,
and a processor,
wherein the store comprises a first database having a plurality of records of prospective customers, each record comprising predictor variables being discretely identifiable in separate fields, each field being categorised into two or more categories, the store further comprising a second database of responders comprising a plurality of records of predictor variables of selected customers,
wherein the processor is adapted to compare the predictor variables for each of the records in the first and the second databases and to generate an output to the user to enable the user to view a comparative result,
wherein the records of the first database are compared to the records of the second database to create a comparative profile report, the processor maintaining a matrix of counts for every category of every variable for both the first and the second databases, so that the process of creating a comparative profile report is passed through the first database,
wherein how often the process of creating the comparative profile report is passed through the first database is not determined by how many predictor variables are stored in the first and the second databases.

2. A system according to claim 1 wherein the processor calculates a statistical significance for the comparative results of the first and second database.

3. A system according to claim 1 wherein the process of creating a comparative report is optimised to involve a maximum of two passes through the first database, independent of the number of variables, and more preferably wherein the processor maintains a matrix of counts for every category of every variable for both first and second databases.

4. A system according to claim 3 wherein the processor is adapted to ensure that transactional variables are correctly aggregated to a related record and the processor maintains a matrix of Boolean flags for every category of every included variable.

5. A system according to claim 1 wherein the user viewable comparative result comprises a category index value being a representation of a ratio of the percentage of the number of records for a given category in the second database over the total records for all categories for the associated variable, compared with the percentage of the number of records in the first database for the same category over the total number of records for all categories for the associated variable in the first database.

6. A system according to claim 1 wherein the processor drives the user output to provide a user viewable display comprising information representative of the relative penetration of a given category, the representation is graphical, such as in the form of a bar chart representative, the size of which graphical representation is representative of the categories index value, the direction of which graphical is representative of, and or the colour of which graphical report is representative of the statistical significance.

7. A system according to claim 1 wherein each record in the first database has a unique identifier which is in the form of an alphanumeric identifier and more preferably in the form of a unique reference number.

8. A system according to claim 1 wherein the second database is a subset of the first database and each record in the second database comprises at least a unique identifier for each record in common with the same record in the first database, and preferably wherein the second database comprises records consisting only of a unique identifier common to records in the first database.

9. A system according to claim 1 wherein the processor is adapted to use weighted modeling analysis of characteristics of predictor variables and results from the comparison of the first and second database to enable selection of records in the first database.

10. A system according to claim 9 wherein the processor scores each of the records in the first database based on the weighted modeling analysis.

11. A system according to claim 9 wherein the processor is adapted to band records in the first database into bands of scores.

12. A system according to claim 11 wherein the processor is adapted automatically to band the records according to predetermined criteria.

13. A system according to claim 11 wherein a user interface enables a user to determine the banding of the records.

14. A system according to claim 9 adapted to hold out a proportion of the first database for analysis, thereby to prevent analysis using the weighted modeling analysis technique.

15. A system according to claim 9 wherein the processor is adapted to assess overall information gained for each variable based on a weight average of the significant weighted modeling analysis measures for all categories of a variable.

16. A system according to claim 15 wherein the processor is adapted to rank variables according to the information gain and enable selection of only the most important variables, and preferably wherein selection is automatic.

17. A system according to claim 9 comprising a user interface adapted to enable a user to exclude one or more variables from the weighted modeling analysis of the data.

18. A system according to claim 9 wherein the processor is configured automatically to select variables for use in the weighted modeling analysis based on at least one of the overall information gain, and maximum and minimum index values for the categories of a variable.

19. A system according to claim 9 wherein the weighted modeling analysis is a hybrid model using both information theory and bayesian probability theory.

20. A system according to claim 9 wherein the weighted modeling analysis technique generates a predicted weight of evidence value according to the following equation:

$$\text{predicted weight of evidence}(Y/N|A_i) = \log_2\{y_i(t_+ - y_+)/y_+(t_i - y_i)\}$$

where:
Y/N is the ratio of responders to non-responders,
A is a variable,
i is the index of a category, $y_+$ is the sum of Yes (Analysis) records, and $t_+$ is the sum of total (Base) records, and $y_i$ is the Yes (Analysis) count of category i, and $t_i$ is the total (Base) count of category i.

21. A system according to claim 1 wherein the processor is adapted to conduct a comparison of the first and second databases to generate a comparative report and to conduct a weight of evidence analysis thereby to enable enhanced selection of individual records from the first database.

22. A system according to claim 9 wherein the processor is adapted to omit weighted modeling analysis calculations for variables or categories with a statistical significance or z-score below a threshold value.

23. A system according to claim 22 wherein the threshold value is variable.

24. A system according to claim 22 wherein the statistical significance for a category is calculated accordingly to following equation:

$$[ZdExp]_i = z_i / \mathrm{sqrt}(n_i)$$

where $z_i = (y_i - e_i)/\mathrm{sqrt}(e_i)$ where $e_i = t_i y_+ / t_+$ and $n_i = (1 - t_i/t_+)(1 - y_+/t_+)$.

25. A system according to claim 22 wherein the threshold value is selectable by a user.

26. A system according to claim 1 comprising a server in communication with a user client computer system.

27. A system according to claim 1 adapted to generate an output to the user output of selected records from the first database.

28. A system according to claim 27 wherein the processor is adapted to remove any records from the second database from the selected results database.

29. A system according to claim 1, involving a maximum of two passes through the first database.

30. A method of creating comparative profile report comprising:

storing a plurality of records of prospective customers in a first database, each record comprising predictor variables being discretely identifiable in separate fields, each field being categorized into two or more categories;

storing responders comprising a plurality of records of predictor variables of selected customers, in a second database, using a processor to compare the predictor variables for each of the records in the first and the second databases and to generate an output to the user to enable the user to view a comparative result, comparing records of the first database and records of the second database to create a comparative profile report, the processor maintaining a matrix of counts for every category of every predictor variable for both the first and the second databases, so that the process passes is passed through the first databases, wherein how often the process of creating the comparative profile report is passed through the first database is not determined by how many predictor variables are stored in the first and the second databases.

31. A method according to claim 30 further comprising transferring marketing data between first and second computers by the steps of assigning a unique identifier to each record in a first marketing database, creating a second database of selected unique identifiers, and transferring the second database between the first and second computers.

32. A method according to claim 31 further comprising the steps of enabling access to the first marketing database by one of the first and second computers and enabling extraction of records from the first marketing database using the unique identifiers from the second database.

33. A method according to claim 31 wherein the unique identifier comprises an alphanumeric string and preferably is a unique reference number.

34. A database analysis system comprising:

a store for storing databases;

a user input;

a user output;

and a processor, wherein the store comprises a first database having a plurality of records of prospective customers, each record comprising predictor variables being discretely identifiable in separate fields, each field being categorised into two or more categories, the store further comprising a second database of responders comprising a plurality of records of predictor variables of selected customers, wherein the processor is adapted to compare the predictor variables for each of the records in the first and the second databases and to generate an output to enable the user to view a comparative result, wherein the processor is adapted to use weighted modeling analysis of characteristics of predictor variables and results from a comparison of the first and the second databases to enable selection of records in the first database, the weighted modeling analysis technique generating a predicted weight of evidence value according to the following equation:

$$\text{predicted weight of evidence}(Y/N|A_i) = \log_2\{y_i(t_+ - y_+)/y_i(t_i - y_i)\}$$

where:

Y/N is the ratio of responders to non-responders,

A is a variable, i is the index of a category, $y_+$ is the sum of Yes (Analysis) records and $t_+$ is the sum of total (Base) records, and $y_i$ is the Yes (Analysis) count of category i, and $t_i$ is the total (Base) count of category i.

35. A database analysis system comprising:

a store for storing databases;

a user input;

a user output;

and a processor, wherein the store comprises a first database having a plurality of records of prospective customers, each record comprising predictor variables being discretely identifiable in separate fields, each field being categorised into two or more categories, the store further comprising a second database of responders comprising a plurality of records of predictor variables of selected customers, wherein the processor is adapted to compare the predictor variables for each of the records in the first and the second databases and to generate an output to enable the user to view a comparative result, wherein the processor is adapted to use weighted modeling analysis of characteristics of predictor variables and results from the comparison of the first and the second databases to enable selection of records in the first database and to omit weighted modeling analysis calculations for variables or categories with a statistical significance below a threshold value, wherein the statistical significance for a category is calculated according to following equation:

$[ZdExp]_i = z_i/\text{sqrt}(n_i)$ where $z_i = (y_i - e_i)/\text{sqrt}(e_i)$ where $e_i = t_i y_+/t_+$ and $n_i = (1 - t_i/t_+)(1 - y_+/t_+)$.

* * * * *